US008520901B2

(12) United States Patent
Nishimoto et al.

(10) Patent No.: US 8,520,901 B2
(45) Date of Patent: Aug. 27, 2013

(54) IMAGE GENERATION SYSTEM, IMAGE GENERATION METHOD, AND INFORMATION STORAGE MEDIUM

(75) Inventors: Yasuhiro Nishimoto, Yokohama (JP); Chihiro Kozasa, Yokohama (JP); Tadashi Sakakibara, Tokyo (JP); Daisuke Sekioka, Tokyo (JP)

(73) Assignee: Namco Bandai Games Inc., Tokyo (JP)

( * ) Notice: Subject to any disclaimer, the term of this patent is extended or adjusted under 35 U.S.C. 154(b) by 166 days.

(21) Appl. No.: 13/157,953

(22) Filed: Jun. 10, 2011

(65) Prior Publication Data
US 2011/0306420 A1 Dec. 15, 2011

(30) Foreign Application Priority Data

Jun. 11, 2010 (JP) ................................. 2010-134576
Jun. 11, 2010 (JP) ................................. 2010-134581

(51) Int. Cl.
*G06K 9/00* (2006.01)
*H04N 7/18* (2006.01)

(52) U.S. Cl.
USPC ............................ 382/107; 348/154; 348/155

(58) Field of Classification Search
USPC ................. 382/103, 107, 236; 348/154, 155, 348/169, 170, 171, 172, 208.1, 208.2, 208.16; 345/420, 473, 474, 475, 463; 715/863
See application file for complete search history.

(56) References Cited

U.S. PATENT DOCUMENTS

| | | | | |
|---|---|---|---|---|
| 5,594,469 A | * | 1/1997 | Freeman et al. | 345/158 |
| 6,266,061 B1 | * | 7/2001 | Doi et al. | 715/863 |
| 6,674,877 B1 | * | 1/2004 | Jojic et al. | 382/103 |
| 6,947,046 B2 | * | 9/2005 | Nimura et al. | 345/473 |
| 2001/0024213 A1 | | 9/2001 | Doi et al. | |
| 2003/0219146 A1 | | 11/2003 | Jepson et al. | |
| 2004/0005924 A1 | | 1/2004 | Watabe et al. | |
| 2007/0254739 A1 | | 11/2007 | Wada | |
| 2008/0052643 A1 | | 2/2008 | Ike et al. | |
| 2010/0238168 A1 | * | 9/2010 | Kim et al. | 345/420 |
| 2011/0230266 A1 | | 9/2011 | Yamaguchi | |

FOREIGN PATENT DOCUMENTS

| | | |
|---|---|---|
| JP | A-10-207619 | 8/1998 |
| JP | A-2008-136695 | 6/2008 |
| JP | A-2011-189066 | 9/2011 |

OTHER PUBLICATIONS

Mikic, I. et al., "Articulated Body Posture Estimation from Multi-Camera Voxel Data," *Proceedings of the 2001 IEEE Conference on Computer Vision and Pattern Recognition*, 2001, pp. I-455-I-460.

Zhang, J. et al., "Representation and Matching of Articulated Shapes," *Proceedings of the 2004 IEEE Computer Society Conference on Computer Vision and Pattern Recognition*, 2004, pp. 342-349.

(Continued)

*Primary Examiner* — Abolfazl Tabatabai
(74) *Attorney, Agent, or Firm* — Oliff & Berridge, PLC

(57) ABSTRACT

An image generation system includes an image information acquisition section that acquires image information from an image sensor, a skeleton information acquisition section that acquires skeleton information based on the image information from the image sensor, the skeleton information specifying a motion of an operator, a reliability information acquisition section that acquires reliability information that indicates reliability of the skeleton information, and an image generation section that generates an image displayed on a display section. The image generation section generates an image corresponding to the acquired reliability information as the image displayed on the display section.

21 Claims, 24 Drawing Sheets

(56) References Cited

OTHER PUBLICATIONS

Partial European Search Report issued in European Patent Application No. 11169646.4 on Oct. 12, 2011.
Apr. 17, 2012 Search Report issued in European Patent Application No. 11169646.4.
U.S. Appl. No. 13/158,000, filed Jun. 10, 2011 in the name of Yasuhiro Nishimoto et al.
U.S. Appl. No. 13/158,003, filed Jun. 10, 2011 in the name of Yasuhiro Nishimoto et al.
U.S. Appl. No. 13/157,986, filed Jun. 10, 2011 in the name of Yasuhiro Nishimoto et al.

* cited by examiner

DEPTH INFORMATION

SKELETON INFORMATION

FIG. 5A

SKELETON INFORMATION

| BONE (JOINT) | POSITION INFORMATION |
|---|---|
| C0(WAIST) | XC0, YC0, ZC0 |
| C1(CHEST) | XC1, YC1, ZC1 |
| C2(NECK) | XC2, YC2, ZC2 |
| ⋮ | ⋮ |

FIG. 5B

RELIABILITY INFORMATION

| BONE (JOINT) | RELIABILITY |
|---|---|
| C0 | DC0 |
| C1 | DC1 |
| C2 | DC2 |
| ⋮ | ⋮ |

RELIABILITY (DETECTION ACCURACY) IS HIGH

RELIABILITY (DETECTION ACCURACY) IS LOW

RELIABILITY (DETECTION ACCURACY) IS HIGH

RELIABILITY (DETECTION ACCURACY) IS LOW

IMAGE GENERATION SYSTEM, IMAGE GENERATION METHOD, AND INFORMATION STORAGE MEDIUM

Japanese Patent Application Nos. 2010-134576 and 2010-134581 both of which were filed on Jun. 11, 2010, are hereby incorporated by reference in their entirety.

BACKGROUND

The present invention relates to an image generation system, an image generation method, an information storage medium, and the like.

A game device that allows the player to perform a game operation using a controller provided with a motion sensor instead of a controller provided with an operation button and a direction key, has been popular. A game device having such an operation interface allows the operator (player or user) to perform an intuitive operation input, and can simplify the game operation, for example. JP-A-2008-136695 discloses a game device that enables such an intuitive interface, for example.

When using such an intuitive interface, however, the operation performed by the operator may be erroneously recognized when the reliability of the input operation information is low, or the detection accuracy of the operation information input by the motion of the operator is low. Moreover, the system may become unstable if the operation information with low reliability or low detection accuracy is frequently input.

SUMMARY

According to one aspect of the invention, there is provided an image generation system comprising;

an image information acquisition section that acquires image information from an image sensor;

a skeleton information acquisition section that acquires skeleton information based on the image information from the image sensor, the skeleton information specifying a motion of an operator;

a reliability information acquisition section that acquires reliability information that indicates reliability of the skeleton information; and an image generation section that generates an image displayed on a display section, the image generation section generating an image corresponding to the acquired reliability information as the image displayed on the display section.

According to another aspect of the invention, there is provided an image generation system comprising:

an image information acquisition section that acquires image information from an image sensor;

a skeleton information acquisition section that acquires skeleton information based on the image information from the image sensor, the skeleton information specifying a motion of an operator;

a reliability information acquisition section that acquires reliability information that indicates reliability of the skeleton information;

an object control section that controls an object; and an image generation section that generates an image displayed on a display section, the object control section controlling the object based on the reliability information.

According to another aspect of the invention, there is provided an image generation system comprising:

an image information acquisition section that acquires image information from an image sensor;

a skeleton information acquisition section that acquires skeleton information based on the image information from the image sensor, the skeleton information specifying a motion of an operator;

a reliability information acquisition section that acquires reliability information that indicates reliability of the skeleton information;

a game calculation section that performs a game calculation process; and an image generation section that generates an image displayed on a display section, the game calculation section performing the game calculation process corresponding to the reliability information.

According to another aspect of the invention, there is provided an image generation system comprising:

an image information acquisition section that acquires image information from an image sensor;

a motion information acquisition that acquires motion information about an operator based on the image information from the image sensor;

a detection accuracy information acquisition section that acquires detection accuracy information about the motion information; and an image generation section that generates an image displayed on a display section, the image generation section changing a display state of the image displayed on the display section based on the detection accuracy information about the motion information about the operator.

According to another aspect of the invention, there is provided an image generation system comprising:

an image information acquisition section that acquires image information from an image sensor;

a motion information acquisition that acquires motion information about an operator based on the image information from the image sensor;

a detection accuracy information acquisition section that acquires detection accuracy information about the motion information;

an object control section that controls an object; and an image generation section that generates an image displayed on a display section, the object control section controlling the object based on the detection accuracy information about the motion information about the operator.

According to another aspect of the invention, there is provided an image generation method comprising:

acquiring image information from an image sensor;

acquiring skeleton information based on the image information from the image sensor, the skeleton information specifying a motion of an operator;

acquiring reliability information that indicates reliability of the skeleton information; and generating an image corresponding to the acquired reliability information as an image displayed on a display section.

According to another aspect of the invention, there is provided an image generation method comprising:

acquiring image information from an image sensor;

acquiring skeleton information based on the image information from the image sensor, the skeleton information specifying a motion of an operator;

acquiring reliability information that indicates reliability of the skeleton information;

controlling an object based on the reliability information; and generating an image displayed on a display section.

According to another aspect of the invention, there is provided an image generation method comprising:

acquiring image information from an image sensor;

acquiring skeleton information based on the image information from the image sensor, the skeleton information specifying a motion of an operator;

acquiring reliability information that indicates reliability of the skeleton information;

performing a game calculation process corresponding to the reliability information; and generating an image displayed on a display section.

According to another aspect of the invention, there is provided an image generation method comprising:

acquiring image information from an image sensor;

acquiring motion information about an operator based on the image information from the image sensor;

acquiring detection accuracy information about the motion information; and changing a display state of an image displayed on a display section based on the detection accuracy information about the motion information about the operator.

According to another aspect of the invention, there is provided an image generation method comprising:

acquiring image information from an image sensor;

acquiring motion information about an operator based on the image information from the image sensor;

acquiring detection accuracy information about the motion information;

controlling an object based on the detection accuracy information about the motion information about the operator; and generating an image displayed on a display section.

According to another aspect of the invention, there is provided a computer-readable information storage medium storing a program that causes a computer to execute the above image generation method.

BRIEF DESCRIPTION OF THE DRAWINGS

FIG. 4 is a view illustrative of a method that calculates skeleton information about an operator based on depth information and the like.

FIGS. 5A and 5B are views illustrative of an example of the data structure of skeleton information and reliability information.

DESCRIPTION OF EXEMPLARY EMBODIMENTS

Figure 1:
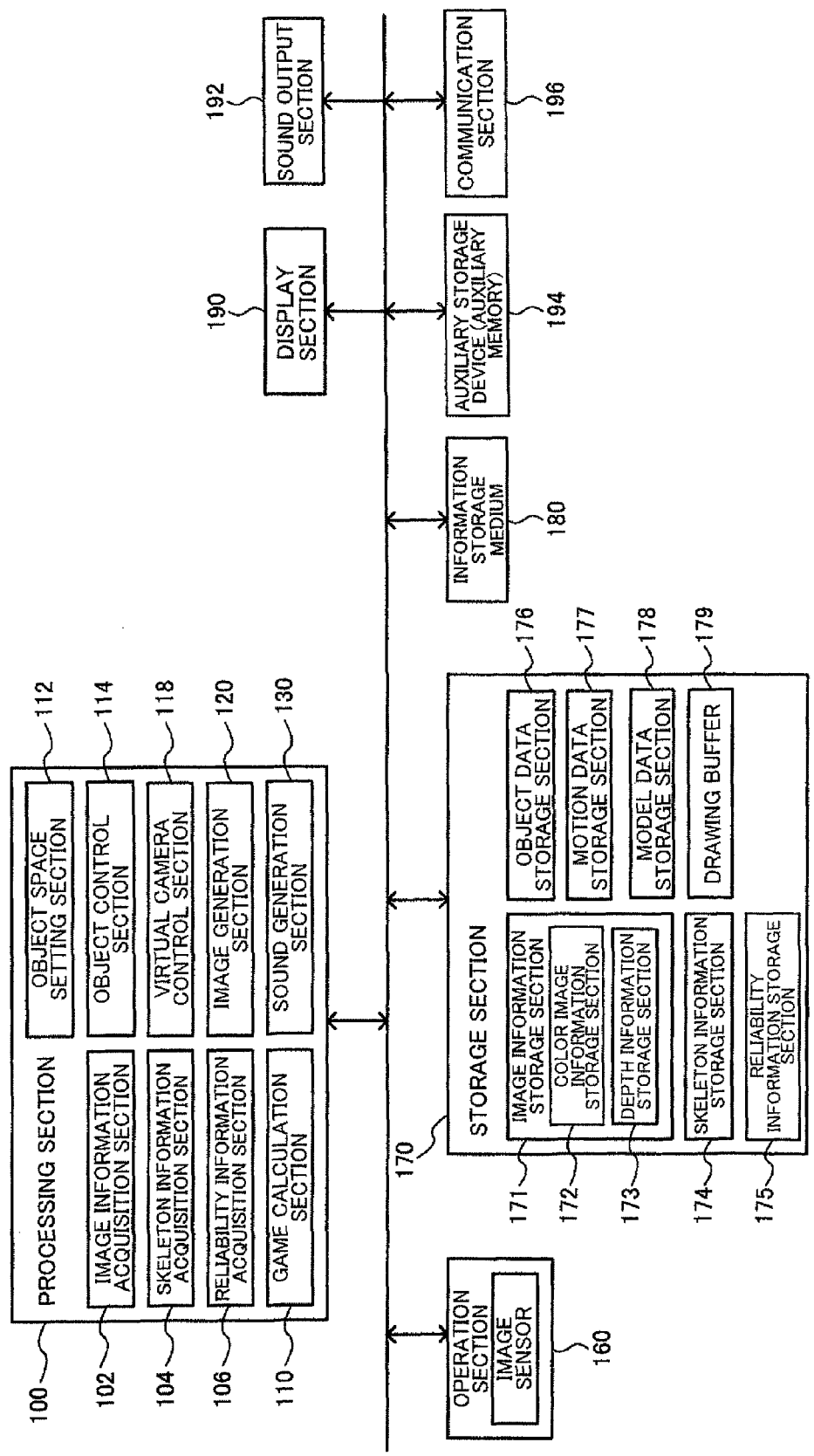
FIG. 1 shows a configuration example of an image generation system according to one embodiment of the invention.

Several aspects of the invention may provide an image generation system, an image generation method, an information storage medium, and the like that can generate an image that reflects the reliability of skeleton information or the detection accuracy of motion information.

According to one embodiment of the invention, there is provided an image generation system comprising:

an image information acquisition section that acquires image information from an image sensor;

a skeleton information acquisition section that acquires skeleton information based on the image information from the image sensor, the skeleton information specifying a motion of an operator;

a reliability information acquisition section that acquires reliability information that indicates reliability of the skeleton information; and an image generation section that generates an image displayed on a display section, the image generation section generating an image corresponding to the acquired reliability information as the image displayed on the display section.

According to one embodiment of the invention, the image information is acquired from the image sensor, and the skeleton information about the operator is acquired based on the image information. The reliability information that indicates the reliability of the skeleton information is also acquired. An image based on the acquired reliability information is generated, and displayed on the display section. This makes it possible to reflect the reliability of the skeleton information in the image displayed on the display section. Therefore, a novel image generation system can be provided.

In the image generation system, the reliability information acquisition section may acquire the reliability information in which reliability of information about each of bones of a skeleton indicated by the skeleton information is linked to each of the bones.

According to the above feature, the reliability information in which the reliability of the information about each of bones (joints) of the skeleton is linked to each of the bones can be used. This makes it possible to generate an image that reflects the reliability of the information about each of bones as the image displayed on the display section.

In the image generation system, the skeleton information may include position information about each of the bones; and the reliability may reliability of a relationship between each part of the operator and each of the bones, and reliability of the position information about each of the bones.

Therefore, the image displayed on the display section can be generated using the reliability information that indicates the reliability of the relationship between each part and each bone of the operator and the reliability of the position information about each bone.

In the image generation system, the reliability information acquisition section may acquire the reliability information in which reliability of information about a bone corresponding to a given part of the operator decreases as the given part approaches another part of the operator.

According to the above feature, when the given part of the operator has approached the other part so that the reliability has decreased, an image that reflects the decrease in reliability can be generated, and displayed on the display section.

In the image generation system, the reliability information acquisition section may acquire the reliability information in which reliability of information about each bone included in the skeleton information decreases when the operator is positioned at a distance equal to or greater than a given distance from the image sensor.

According to the above feature, when the operator is positioned at a distance equal to or greater than a given distance from the image sensor so that the reliability has decreased, an image that reflects the decrease in reliability can be generated, and displayed on the display section.

In the image generation system, the reliability information acquisition section may acquire the reliability information in which the reliability of the skeleton information decreases as a processing load related to the skeleton information increases.

According to the above feature, when the processing load has increased due to the skeleton information so that the reliability has decreased, an image that reflects the decrease in reliability can be generated, and displayed on the display section.

In the image generation system, the image generation section may change a display state of the image displayed on the display section based on the reliability information.

According to the above feature, since the display state of the image displayed on the display section changes when the reliability indicated by the reliability information has increased or decreased, it is possible to notify the operator of an increase or a decrease in reliability through a change in display state of the image.

The image generation system may further comprise:

an object control section that controls an object, the image generation section may change a display state of the object based on reliability of information about a bone corresponding to a given part of the operator, the object being displayed on the display section corresponding to the given part of the operator.

According to the above feature, since the display state of the object displayed on the display section corresponding to the given part of the operator changes when the reliability indicated by the reliability information has increased or decreased, it is possible to notify the operator of the increase or decrease in reliability through a change in display state of the object.

In the image generation system, the image generation section may perform at least one of a process that blurs the object corresponding to the given part, a process that displays the object becoming almost transparent, and a process that changes a color of the object, as the reliability of the information about the bone corresponding to the given part decreases.

According to the above feature, since the object corresponding to the given part of the operator is blurred, displayed almost transparently, or changed in color when the reliability has decreased, it is possible to notify the operator of the decrease in reliability through a change in image.

In the above image generation system, the image generation section may perform at least one of a process that blurs the object corresponding to the given part, a process that displays the object almost transparently, a process that changes a color of the object, a process that changes brightness of the object, a process that changes a display state of a contour of the object, a process that changes a size of the object, and a process that changes an effect applied to the object, as the reliability of the information about the bone corresponding to the given part decreases.

According to the above feature, since the object corresponding to the given part of the operator is blurred, displayed almost transparently, changed in color, changed in brightness, changed in display state of the contour, changed in size, or changed in effect when the reliability has decreased, it is possible to notify the operator of the decrease in reliability through a change in image.

In the image generation system, the given part may be a hand of the operator, and the object may be a hand object that moves or makes a motion based on a motion of the hand of the operator.

This makes it possible to cause the hand object to move or make a motion based on the motion of the hand of the operator, and change the display state of the hand object when the reliability has increased or decreased.

In the image generation system, the object may be an icon that moves based on a motion of the given part of the operator.

This makes it possible to cause the icon to move based on the motion of the given part of the operator, and change the display state of the icon when the reliability has increased or decreased.

In the image generation system, the image generation section may change a display state of an operation target object that is an operation target of the operator based on the reliability information.

According to the above feature, when the display state of the operation target object has changed, the operator can easily determine an increase or a decrease in reliability concerning the operation target object.

In the image generation system, the image generation section may change a display state of the image displayed on the display section based on prediction information about a change in the reliability indicated by the reliability information.

This makes it possible to change the display state of the image by predicting a change in reliability. Therefore, the operator can determine a decrease in reliability before the reliability decreases to a value smaller than the threshold value, for example.

The image generation system may further comprise:
an object control section that controls an object,
the object control section may control the object based on the reliability information.

According to the above feature, since control of the object for generating an image changes when the reliability indicated by the reliability information has increased or decreased, it is possible to notify the operator of the increase or a decrease in reliability through a change in control of the object.

In the image generation system,
the object control section may limit or stop at least one of a movement and a motion of the object when the reliability indicated by the reliability information has decreased.

According to the above feature, since the movement and the motion of the object are limited or stopped when the reliability has decreased, it is possible to prevent a situation in which the object is controlled based on an erroneous operation, for example.

In the above image generation system, the object control section may control the object so that the object makes at least one of a movement and a motion based on a motion of a given part of the operator, and may limit or stop at least one of the movement and the motion of the object when the reliability of information about a bone corresponding to the given part has decreased.

According to the above feature, the object moves or makes a motion based on the motion of the given part of the operator, and the movement or the motion of the object is limited or stopped when the reliability of the information about the bone corresponding to the given part has decreased. This makes it possible to implement novel object control.

In the image generation system,
the object control section may limit or stop at least one of a movement and a motion of the object when a given wait period has elapsed after it has been determined that the reliability indicated by the reliability information has decreased.

According to the above feature, the movement or the motion of the object is not limited or stopped until the wait period elapses even if the reliability has decreased. Therefore, the stability of the operation and the like can be ensured.

In the above image generation system, the image generation section may generate an image of a selection screen that allows the operator to select whether or not to continue to control the object after the wait period has elapsed.

This makes it possible to allow the operator to select whether or not to continue to control the object based on the motion of the given part after the wait period has elapsed, for example.

The image generation system may further comprise:
a game calculation section that performs a game calculation process,
the game calculation section may perform the game calculation process corresponding to the reliability information.

According to the above feature, the details of the game calculation are changed when the reliability indicated by the reliability information has increased or decreased. This makes it possible to implement a game calculation process that reflects the reliability.

In the image generation system,
the game calculation section may perform a game result calculation process corresponding to the reliability information as the game calculation process.

This makes it possible to reflect the reliability in the game result, so that a novel game result calculation process can be implemented.

In the above image generation system, the game calculation section may perform the game result calculation process so that a game result obtained when reliability indicated by the reliability information is low is higher than a game result obtained when the reliability is high.

According to the above feature, since the game result obtained when the reliability is low is higher than the game result obtained when the reliability is high, a situation in which the operation is erroneously recognized can be suppressed, or a stable game calculation process can be implemented.

According to another embodiment of the invention, there is provided an image generation system comprising:
an image information acquisition section that acquires image information from an image sensor;
a skeleton information acquisition section that acquires skeleton information based on the image information from the image sensor, the skeleton information specifying a motion of an operator;
a reliability information acquisition section that acquires reliability information that indicates reliability of the skeleton information;
an object control section that controls an object; and
an image generation section that generates an image displayed on a display section,
the object control section controlling the object based on the reliability information.

According to another embodiment of the invention, there is provided an image generation system comprising:
an image information acquisition section that acquires image information from an image sensor;
a skeleton information acquisition section that acquires skeleton information based on the image information from the image sensor, the skeleton information specifying a motion of an operator;
a reliability information acquisition section that acquires reliability information that indicates reliability of the skeleton information;
a game calculation section that performs a game calculation process; and
an image generation section that generates an image displayed on a display section,
the game calculation section performing the game calculation process corresponding to the reliability information.

According to another embodiment of the invention, there is provided an image generation system comprising:
an image information acquisition section that acquires image information from an image sensor;
a motion information acquisition that acquires motion information about an operator based on the image information from the image sensor;
a detection accuracy information acquisition section that acquires detection accuracy information about the motion information; and
an image generation section that generates an image displayed on a display section,
the image generation section changing a display state of the image displayed on the display section based on the detection accuracy information about the motion information about the operator.

According to above embodiment, the image information is acquired from the image sensor, and the motion information about the operator is acquired based on the image information. The detection accuracy information about the motion information is also acquired. The display state of the image displayed on the display section is changed based on the acquired detection accuracy information. This makes it possible to generate an image that reflects the detection accuracy of the motion information. Therefore, a novel image generation system can be provided.

The image generation system may further comprise:

an object control section that controls an object, the image generation section may change a display state of the object based on the detection accuracy information about the motion information.

According to the above feature, since the display state of the object changes when the detection accuracy of the motion information has changed, it is possible to notify the operator of the detection accuracy through a change in display state of the image of the object, In the image generation system, the object control section may control the object so that the object moves or makes a motion based on the motion information about the operator; and the image generation section may change the display state of the object that moves or makes a motion based on the motion information based on the detection accuracy information about the motion information.

This makes it possible to cause the object to move or make a motion based on the motion information about the operator, and change the display state of the object when the detection accuracy of the motion information has changed. Therefore, the operator can determine the detection accuracy through a change in display state of the image of the object.

In the image generation system, the image generation section may perform at least one of a process that blurs the object, a process that displays the object becoming almost transparent, and a process that changes a color of the object, as detection accuracy indicated by the detection accuracy information decreases.

According to the above feature, since the object is blurred, displayed almost transparently, or changed in color when the detection accuracy has decreased, it is possible to notify the operator of the decrease in detection accuracy through a change in image.

In the image generation system, the detection accuracy information acquisition section may acquire the detection accuracy information in which the detection accuracy decreases as a given part of the operator approaches another part of the operator; and the image generation section may perform at least one of a process that blurs the object, a process that displays the object becoming almost transparent, and a process that changes the color of the object, and may perform a process that changes a size of the object, as the given part of the operator approaches the other part of the operator.

According to the above feature, when the given part of the operator has approached the other part so that the detection accuracy has decreased, the object is blurred, displayed almost transparently, or changed in color, and changed in size. This makes it possible to allow the operator to intuitively determine that the detection accuracy has decreased since the given part of the operator has approached the other part of the operator.

In the above image generation system, the image generation section may perform at least one of a process that blurs the object, a process that displays the object almost transparently, a process that changes a color of the object, a process that changes brightness of the object, a process that changes a display state of a contour of the object, a process that changes a size of the object, and a process that changes an effect applied to the object, as detection accuracy indicated by the detection accuracy information decreases.

According to the above feature, since the object corresponding to the given part of the operator is blurred, displayed almost transparently, changed in color, changed in brightness, changed in display state of the contour, changed in size, or changed in effect when the detection accuracy has decreased, it is possible to notify the operator of the decrease in detection accuracy through a change in image.

In the image generation system, the object may be a hand object that moves or makes a motion based on a motion of a hand of the operator; and the image generation section may change a display state of the hand object based on the detection accuracy information about the motion information.

This makes it possible to cause the hand object to move or make a motion based on the motion of the hand of the operator, and change the display state of the hand object when the detection accuracy has increased or decreased.

In the image generation system, the object may be an icon that moves or makes a motion based on a motion of a given part of the operator; and the image generation section may change a display state of the icon based on the detection accuracy information about the motion information.

This makes it possible to cause the icon to move based on the motion of the given part of the operator, and change the display state of the icon when the detection accuracy has increased or decreased.

In the image generation system, the object may be an operation target object that is an operation target of the operator; and the image generation section may change a display state of the operation target object based on the detection accuracy information about the motion information.

This makes it possible to change the display state of the operation target object that is the operation target of the operator based on the detection accuracy of the motion information about the operator.

In the image generation system, the operation target object may be an object used to issue an operation instruction to a visual instrument or a game device.

This makes it possible to change the display state of the operation target object used to issue an operation instruction to a visual instrument or a game device based on the detection accuracy of the motion information about the operator.

In the image generation system, the operation target object may be used to issue at least one of a content selection instruction, an instrument operation instruction, and a content play/record instruction to a visual instrument or a game device.

This makes it possible to change the display state of the operation target object used to issue at least one of a content selection instruction, an instrument operation instruction, and a content play/record instruction to the visual instrument or the game device based on the detection accuracy of the motion information about the operator.

In the image generation system, the object control section may limit or prohibit an operation of the operator on the operation target object when detection accuracy indicated by the detection accuracy information has decreased.

According to the above feature, when the detection accuracy of the motion information about the operator is low, the operation of the operator on the operation target object is limited or prohibited. This prevents a situation in which the operation of the operator is erroneously recognized so that a visual instrument or a game device is erroneously operated.

In the above image generation system, the object control section may allow an operation of the operator on the operation target object when the detection accuracy indicated by the detection accuracy information has increased.

According to the above feature, since the operation of the operator on the operation target object is allowed only when the detection accuracy of the motion information about the operator is high, a stable operation instruction to a visual instrument or a game device can be can be implemented.

In the image generation system, the object control section may increase the number of candidate objects of the operation target object as detection accuracy indicated by the detection accuracy information decreases.

According to the above feature, since the number of candidate objects of the operation target object increases when the detection accuracy of the motion information about the operator is low, the operator can issue the desired operation instruction by selecting the desired candidate object as the operation target object, for example.

In the image generation system, the detection accuracy information acquisition section may acquire the detection accuracy information in which detection accuracy of the motion information decreases as a given part of the operator approaches another part of the operator.

According to the above feature, when the given part of the operator has approached the other part so that the detection accuracy of the motion information has decreased, an image that reflects the decrease in detection accuracy can be generated, and displayed on the display section.

In the image generation system, the detection accuracy information acquisition section may acquire the detection accuracy information in which detection accuracy of the motion information decreases when the operator is positioned at a distance equal to or greater than a given distance from the image sensor.

According to the above feature, when the operator is positioned at a distance equal to or greater than a given distance from the image sensor so that the detection accuracy of the motion information has decreased, an image that reflects the decrease in reliability can be generated, and displayed on the display section.

According to another embodiment of the invention, there is provided an image generation system comprising:

an image information acquisition section that acquires image information from an image sensor;

a motion information acquisition that acquires motion information about an operator based on the image information from the image sensor;

a detection accuracy information acquisition section that acquires detection accuracy information about the motion information;

an object control section that controls an object; and an image generation section that generates an image displayed on a display section, the object control section controlling the object based on the detection accuracy information about the motion information about the operator.

In the image generation system, the object may be an operation target object that is an operation target of the operator; and the object control section may limit or prohibit an operation of the operator on the operation target object when detection accuracy indicated by the detection accuracy information has decreased.

In the above image generation system, the object may be an operation target object that is an operation target of the operator, and the object control section may allow an operation of the operator on the operation target object when detection accuracy indicated by the detection accuracy information has increased.

According to another embodiment of the invention, there is provided an image generation method comprising:

acquiring image information from an image sensor;

acquiring skeleton information based on the image information from the image sensor, the skeleton information specifying a motion of an operator;

acquiring reliability information that indicates reliability of the skeleton information; and generating an image corresponding to the acquired reliability information as an image displayed on a display section.

According to another embodiment of the invention, there is provided an image generation method comprising:

acquiring image information from an image sensor;

acquiring skeleton information based on the image information from the image sensor, the skeleton information specifying a motion of an operator;

acquiring reliability information that indicates reliability of the skeleton information;

controlling an object based on the reliability information; and generating an image displayed on a display section.

According to another embodiment of the invention, there is provided an image generation method comprising:

acquiring image information from an image sensor;

acquiring skeleton information based on the image information from the image sensor, the skeleton information specifying a motion of an operator;

acquiring reliability information that indicates reliability of the skeleton information;

performing a game calculation process corresponding to the reliability information; and generating an image displayed on a display section.

According to another embodiment of the invention, there is provided an image generation method comprising:

acquiring image information from an image sensor;

acquiring motion information about an operator based on the image information from the image sensor;

acquiring detection accuracy information about the motion information; and changing a display state of an image displayed on a display section based on the detection accuracy information about the motion information about the operator.

According to another embodiment of the invention, there is provided an image generation method comprising:

acquiring image information from an image sensor;

acquiring motion information about an operator based on the image information from the image sensor;

acquiring detection accuracy information about the motion information;

controlling an object based on the detection accuracy information about the motion information about the operator; and generating an image displayed on a display section.

According to another embodiment of the invention, there is provided a computer-readable information storage medium storing a program that causes a computer to execute the above image generation method.

Exemplary embodiments of the invention are described below. Note that the following exemplary embodiments do not in any way limit the scope of the invention laid out in the claims. Note that all elements of the following embodiments should not necessarily be taken as essential requirements for the invention.

1. Configuration

FIG. 1 shows an example of a block diagram of an image generation system (game device or visual instrument) according to one embodiment of the invention. Note that the image generation system according to one embodiment of the invention is not limited to the configuration shown in FIG. 1. Various modifications may be made, such as omitting some of the elements (sections) or adding other elements (sections).

An operation section 160 allows the operator to input operation information. The operation section 160 includes an image sensor that is implemented by a color image sensor, a depth sensor, or the like. The function of the operation section 160 may be implemented by only the image sensor, or may be implemented by the image sensor and an operation device (e.g., direction key, an operation button, an analog stick, a lever, a sensor (e.g., angular velocity sensor or acceleration sensor), a microphone, or a touch panel display) other than the image sensor.

A storage section 170 serves as a work area for a processing section 100, a communication section 196, and the like. The function of the storage section 170 may be implemented by a RAM (DRAM or VRAM) or the like. A game program and game data that is necessary when executing the game program are stored in the storage section 170.

An information storage medium 180 (computer-readable medium) stores a program, data, and the like. The function of the information storage medium 180 may be implemented by an optical disk (DVD), a hard disk drive (HDD), a memory (e.g., ROM), or the like. The processing section 100 performs various processes according to one embodiment of the invention based on a program (data) stored in the information storage medium 180. Specifically, a program that causes a computer (i.e., a device including an operation section, a processing section, a storage section, and an output section) to function as each section according to one embodiment of the invention (i.e., a program that causes a computer to execute the process of each section) is stored in the information storage medium 180.

A display section 190 outputs an image generated according to one embodiment of the invention. The function of the display section 190 may be implemented by an LCD, an organic EL display, a CRT, a touch panel display, a head mount display (HMD), or the like. A sound output section 192 outputs sound generated according to one embodiment of the invention. The function of the sound output section 192 may be implemented by a speaker, a headphone, or the like.

An auxiliary storage device 194 (auxiliary memory or secondary memory) is a storage device used to supplement the capacity of the storage section 170. The auxiliary storage device 194 may be implemented by a memory card such as an SD memory card or a multimedia card, or the like.

The communication section 196 communicates with the outside (e.g., another image generation system, a server, or a host device) via a cable or wireless network. The function of the communication section 196 may be implemented by hardware such as a communication ASIC or a communication processor, or communication firmware.

A program (data) that causes a computer to function as each section according to one embodiment of the invention may be distributed to the information storage medium 180 (or the storage section 170 or the auxiliary storage device 194) from an information storage medium included in a server (host device) via a network and the communication section 196. Use of the information storage medium included in the server (host device) is also intended to be included within the scope of the invention.

The processing section 100 (processor) performs a game process, an image generation process, a sound generation process, and the like based on the operation information from the operation section 160, a program, and the like. The processing section 100 performs various processes using the storage section 170 as a work area. The function of the processing section 100 may be implemented by hardware such as a processor (e.g., CPU or GPU) or an ASIC (e.g., gate array), or a program.

The processing section 100 includes an image information acquisition section 102, a skeleton information acquisition section 104, a reliability information acquisition section 106, a game calculation section 110, an object space setting section 112, an object control section 114, a virtual camera control section 118, an image generation section 120, and a sound generation section 130. Note that various modifications may be made, such as omitting some of these elements or adding other elements.

The image information acquisition section 102 acquires image information from the image sensor. For example, information about an image captured by the image sensor is stored in an image information storage section 171 included in the storage section 170. Specifically, information about a color image captured by the color image sensor of the image sensor is stored in a color image information storage section 172, and information about a depth image captured by the depth sensor of the image sensor is stored in a depth information storage section 173. The image information acquisition section 102 reads (acquires) the image information from the image information storage section 171.

The skeleton information acquisition section 104 acquires skeleton information, and the reliability information acquisition section 106 acquires reliability information. The skeleton information is stored in a skeleton information storage section 174, and the reliability information is stored in a reliability information storage section 175. The details of the skeleton information acquisition section 104 and the reliability information acquisition section 106 are described later.

The game calculation section 110 performs a game calculation process. The game calculation process includes starting the game when game start conditions have been satisfied, proceeding with the game, calculating the game results, and finishing the game when game finish conditions have been satisfied, for example.

The object space setting section 112 sets an object space where a plurality of objects are disposed. For example, the object space setting section 112 disposes an object (i.e., an object formed by a primitive surface such as a polygon, a free-form surface, or a subdivision surface) that represents a display object such as a character (e.g., human, animal, robot, car, ship, or airplane), a map (topography), a building, a course (road), a tree, or a wall in the object space. When the object is a three-dimensional object, the object space setting section 112 determines the position and the rotation angle (synonymous with orientation or direction) of the object in a world coordinate system, and disposes the object at the determined position (X, Y, Z) and the determined rotation angle (rotation angles around X, Y, and Z axes). More specifically, an object data storage section 176 of the storage section 170 stores an object number, and object data (e.g., the position, rotation angle, moving speed, and moving direction of the object (part object)) that is linked to the object number. The object space setting section 112 updates the object data every frame, for example.

The object control section 114 controls the object. For example, the object control section 114 controls at least one of the movement and the motion of the object based on the operation information input by the player using the operation section 160, a program (movement/motion algorithm), various types of data, and the like. More specifically, the object control section 114 performs a simulation process that sequentially calculates movement information (position, rotation angle, speed, or acceleration) about the object every frame (e.g., 1/60th of a second). The object control section 114 also performs a motion process, an animation process, and the like on the object. The term "frame" refers to a time unit used when performing the object movement/motion process or the image generation process.

The object controlled by the object control section 114 may be a three-dimensional object disposed in a three-dimensional object space, or may be a two-dimensional object drawn on a two-dimensional screen (display screen). When the object is an object of a character indicated by a three-dimensional model, the object control section 114 performs a motion process (motion replay or motion generation) that causes the character to make a motion. The motion process may be implemented by reproducing the motion of the character based on motion data stored in a motion data storage section 177, for example. The motion data storage section 177 stores the motion data including the position or the rotation angle (i.e., the rotation angles of a child bone around three axes with respect to a parent bone) of each bone that forms the skeleton of the character (model object) (i.e., each part object that forms the character). A model data storage section 178 stores model data about the model object that indicates the character.

The virtual camera control section 118 controls a virtual camera (viewpoint or reference virtual camera) for generating an image viewed from a given (arbitrary) viewpoint in the object space. Specifically, the virtual camera control section 118 controls the position (X, Y, Z) or the rotation angle (rotation angles around X, Y, and Z axes) of the virtual camera (i.e., controls the viewpoint position, the line-of-sight direction, or the angle of view).

The image generation section 120 performs a drawing process based on the result of various processes (game process and simulation process) performed by the processing section 100 to generate an image, and outputs the generated image to the display section 190. Specifically, the image generation section 120 performs a geometric process (e.g., coordinate transformation (world coordinate transformation and camera coordinate transformation), clipping, perspective transformation, or light source process), and generates drawing data (e.g., primitive surface vertex position coordinates, texture coordinates, color data, normal vector, or $\alpha$-value) based on the result of the geometric process. The image generation section 120 draws the object (one or more primitive surfaces) subjected to perspective transformation in a drawing buffer 179 (i.e., a buffer (e.g., frame buffer or work buffer) that can store image information in pixel units) based on the drawing data (primitive surface data). The image generation section 120 thus generates an image viewed from the virtual camera (given viewpoint) in the object space. The drawing process may be implemented by a vertex shader process or a pixel shader process.

The image generation section 120 may generate a stereoscopic image. In this case, a left-eye virtual camera and a right-eye virtual camera are disposed using a reference virtual camera position and a reference inter-camera distance. The image generation section 120 generates a left-eye image viewed from the left-eye virtual camera in the object space, and generates a right-eye image viewed from the right-eye virtual camera in the object space. Stereoscopic vision may be implemented by a stereoscopic glass method or a naked-eye method using a lenticular lens or the like by utilizing the left-eye image and the right-eye image.

The sound generation section 130 performs a sound process based on the result of various processes performed by the processing section 100 to generate game sound (e.g., background music (BGM), effect sound, or voice), and outputs the generated game sound to the sound output section 192.

When the image information acquisition section 102 has acquired the image information from the image sensor, the skeleton information acquisition section 104 acquires the skeleton information about the operator based on the image information from the image sensor.

The skeleton information specifies the motion of the operator viewed from the image sensor, for example. Specifically, the skeleton information includes a plurality of pieces of joint position information corresponding to a plurality of joints of the operator, each of the plurality of pieces of joint position information including three-dimensional coordinate information. Each joint connects bones, and a skeleton is formed by connecting a plurality of bones. The joint position information is used as position information about the bone.

The reliability information acquisition section 106 acquires reliability information that indicates the reliability of the skeleton information. The image generation section 120 generates an image corresponding to the acquired reliability information as an image displayed on the display section 190. For example, the image generation section 120 changes the display state of the image displayed on the display section 190 based on the reliability information. When the game calculation section 110 has performed the game calculation process corresponding to the reliability information, or the object control section 114 has performed the object control process based on the reliability information, the image generation section 120 generates an image corresponding to the reliability information by generating an image based on the game calculation process or the object control process.

For example, the reliability information acquisition section 106 acquires the reliability information in which the reliability of the information (position information or link (relationship) information) about each bone (joint) of the skeleton indicated by the skeleton information is linked to each bone. The skeleton information includes the position information about each bone (each joint) that is linked to each part (e.g., hand, foot, waist, trunk, neck, or head) of the operator. In this case, the reliability indicated by the reliability information indicates the reliability of a link (relationship) between each part and each bone of the operator and the position information about each bone.

The reliability information acquisition section 106 acquires the reliability information in which the reliability of information (position information or link information) about the bone corresponding to a given part (e.g., hand or foot) of the operator decreases as the given part approaches another part (e.g., trunk, head, or the other hand or foot) of the operator. Specifically, the reliability information acquisition section 106 acquires the reliability information in which the reliability decreases when the given part cannot be distinguished from another part. Alternatively, the reliability information acquisition section 106 acquires the reliability information in which the reliability of the information about the bone included in the skeleton information decreases when the operator is positioned at a distance equal to or greater than a given distance from the image sensor. Specifically, the reliability information acquisition section 106 acquires the reliability information in which the reliability information decreases when the operator is positioned away from the image sensor, and it is impossible (or very difficult) to acquire the reliability information from the image information from the image sensor. Alternatively, the reliability information acquisition section 106 may acquire the reliability information in which the reliability of the skeleton information decreases as the processing load related to the skeleton information increases. For example, the reliability of the skeleton information decreases when the number of operators captured by the image sensor exceeds an allowable number of operators (e.g., two) for which the skeleton information can be acquired (i.e., the processing load increases due to the skeleton information). The reliability information acquisition section 106 acquires such information as the reliability information. The skeleton information and the reliability information may be integrated.

The image generation section 120 changes the display state of the image displayed on the display section 190 based on the acquired reliability information. In this case, the image generation section 120 may change the display state of the image displayed on the display section 190 based on prediction information (e.g., change rate information) about a change in reliability indicated by the reliability information. For example, the image generation section 120 changes the display state of the image when it has been predicted that the reliability will become equal to or lower than a given threshold value.

Specifically, the image generation section 120 changes the display state of an object based on the reliability of the information about the bone (bone/joint of the hand or foot) corresponding to a given part (e.g., hand or foot) of the operator, the object being displayed on the display section 190 corresponding to the given part of the operator. The object displayed corresponding to the given part is an object that moves or make a motion based on the motion of the given part, and may be a two-dimensional object or a three-dimensional object.

The image generation section 120 performs at least one of a process that blurs the object corresponding to the given part (blur filter process), a process that displays the object corresponding to the given part becoming almost transparent (process that changes the α-value), and a process that changes the color of the object corresponding to the given part (process that changes the color of the object to a color close to the target color), as the reliability of the information about the bone corresponding to the given part decreases. Alternatively, the image generation section 120 may perform at least one of a process that changes the brightness (luminance) of the object corresponding to the given part, a process that changes the display state (width or depth) of the contour of the object corresponding to the given part, a process that changes the size of the object corresponding to the given part, and a process that changes an effect applied to the object corresponding to the given part, as the reliability of the information about the bone corresponding to the given part decreases. The process that changes the display state of the object may include a process that causes the object (icon) to disappear.

The given part may be the hand of the operator, and the object may be a hand object that moves or makes a motion based on the motion of the hand of the operator. Note that the given part is not limited thereto. The given part may be the foot or the like of the operator. The object may be an icon (cursor) that moves based on the motion of the given part of the operator. The icon is a display object that represents the given part of the operator using a picture, a symbol, or the like that symbolizes the given part.

The image generation section 120 may change the display state of an operation target object operated by the operator based on the reliability information. According to this configuration, when the display state of the operation target object operated by the operator has changed, the operator can easily determine an increase or a decrease in reliability concerning the operation on the operation target object, for example.

The object control section 114 may control the object (two-dimensional object or three-dimensional object) based on the reliability information. Specifically, the object control section 114 limits or stops at least one of the movement and the motion of the object when the reliability indicated by the reliability information has decreased. More specifically, the object control section 114 controls the object so that the object makes at least one of a movement and a motion based on the motion of a given part of the operator, and limits or stops at least one of the movement and the motion of the object when the reliability of information about the bone corresponding to the given part has decreased. For example, the object control section 114 detects the motion of a given part of the operator based on the image information from the image sensor when the reliability is high, and controls the object so that the object makes at least one of a movement and a motion based on the motion of the operator. The object control section 114 limits or stops at least one of the movement and the motion of the object when the reliability has decreased to a value smaller than a given threshold value, for example.

In this case, the object control section 114 may limit or stop at least one of the movement and the motion of the object when a given wait period has elapsed after it has been determined that the reliability indicated by the reliability information has decreased. Specifically, the object control section 114 does not limit or stop the movement or the motion of the object immediately after the reliability has decreased, but waits for the given wait period to elapse. The object control section 114 limits or stops at least one of the movement and the motion of the object when the reliability remains low (i.e., is lower than the given threshold value) after the wait period has elapsed.

The image generation section 120 generates an image of a selection screen that allows the operator to select whether or not to continue to control the object (i.e., whether or not to continue to play the game) after the wait period has elapsed. When the operator has selected to continue to control the object (i.e., continue to play the game) using the selection screen, the object control section 114 continues to cause the object to move or make a motion instead of stopping the movement or the motion of the object. When the operator has selected not to continue to control the object, the object control section 114 limits or stops the movement or the motion of the object (e.g., the game ends).

The game calculation section 110 may perform the game calculation process corresponding to the reliability information. For example, the game calculation section 110 performs a game result calculation process, a game process, or the like corresponding to the reliability information.

For example, the game calculation section 110 performs the game result calculation process corresponding to the reliability as the game calculation process. For example, the game calculation section 110 changes the game result calculated by the game result calculation process based on the reliability information. Specifically, the game calculation section 110 performs the game calculation process so that the game result obtained when the reliability indicated by the reliability information is low (i.e., the reliability is lower than a given threshold value) is lower than the game result obtained when the reliability is high (i.e., the reliability is higher than the given threshold value). For example, the game calculation section 110 outputs a first-rank (first-score) game result when the reliability is high, and outputs a second-rank (second-score) game result lower than the first-rank game result when the reliability is low.

Figure 2:
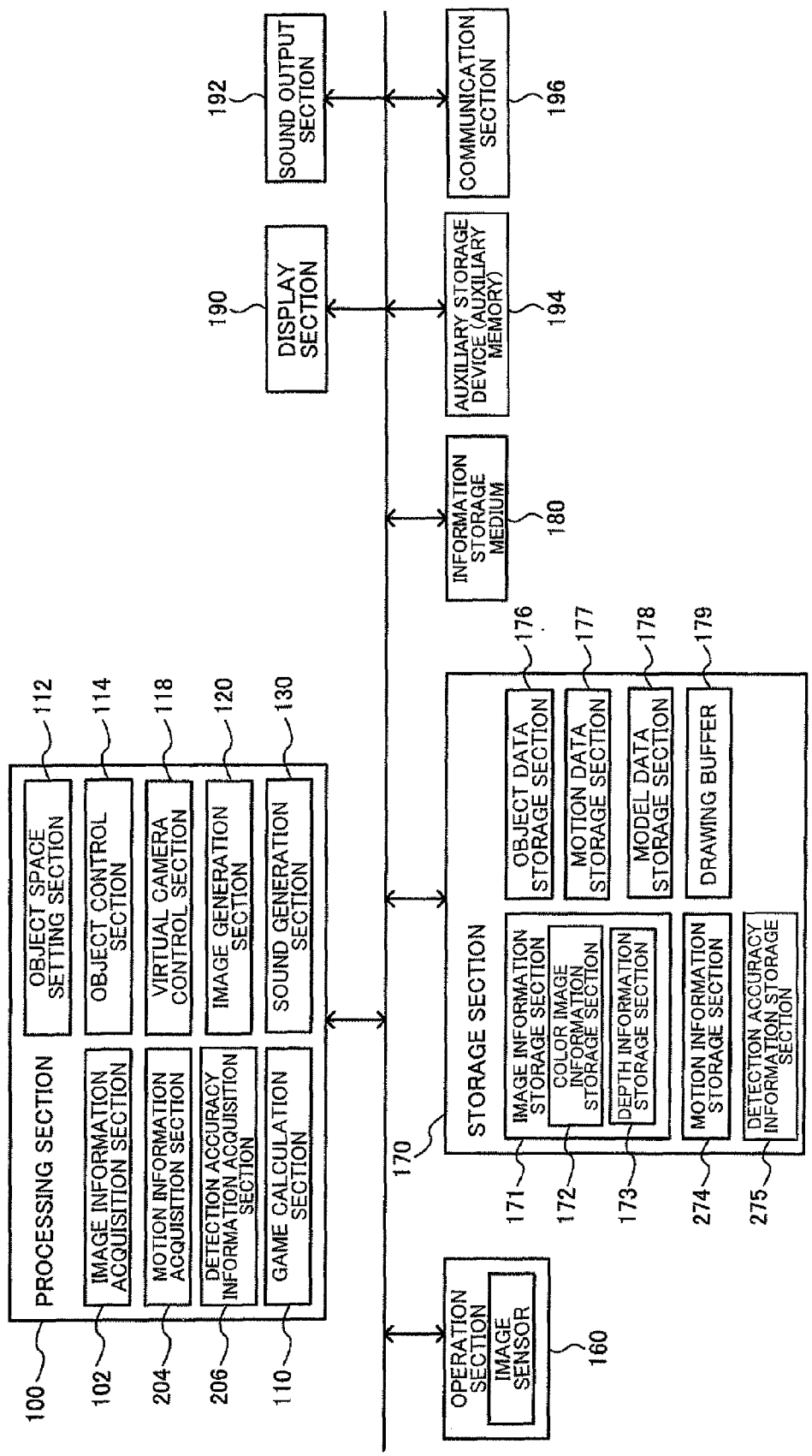
FIG. 2 shows a second configuration example of an image generation system according to one embodiment of the invention.

FIG. 2 is a block diagram showing a second configuration example of the image generation system (e.g., game device or visual instrument) according to one embodiment of the invention. In FIG. 2, the processing section 100 includes a motion information acquisition section 204 and a detection accuracy information acquisition section 206 respectively instead of the skeleton information acquisition section 104 and the reliability information acquisition section 106 shown in FIG. 1. In FIG. 2, the storage section 170 includes a motion information storage section 274 and a detection accuracy information storage section 275 respectively instead of the skeleton information storage section 174 and the reliability information storage section 175 shown in FIG. 1. The other elements shown in FIG. 2 are the same as those shown in FIG. 1. Therefore, detailed description thereof is omitted.

According to the second configuration example shown in FIG. 2, when the image information acquisition section 102 has acquired the image information from the image sensor, the motion information acquisition section 204 acquires the motion information about the operator based on the image information from the image sensor.

Examples of the motion information include optical flow information (e.g., motion vector), information that indicates the motion of each part of the operator, skeleton information about the operator, and the like. The optical flow information indicates the motion of the operator in a captured image that has been captured by the image sensor using a motion vector. The information that indicates the motion of each part of the operator specifies the motion of each part of the operator.

The detection accuracy information acquisition section 206 acquires detection accuracy information that indicates the detection accuracy of the motion information. The detection accuracy information indicates the accuracy or the reliability of the detected motion information. For example, the detection accuracy information indicates the degree of reliability of the motion information. The motion information and the detection accuracy information may be integrated. When the motion information is skeleton information, the detection accuracy information indicates the reliability of the skeleton information.

Note that the detection accuracy information is not limited to the reliability information about the skeleton information. The detection accuracy information may indicate the detection accuracy of the optical flow motion information or the motion information that indicates the motion of a part of the operator. For example, the motion information may indicate a change in shape, color, or the like of each part of the operator with the lapse of frames. In this case, the detection accuracy information indicates the accuracy (reliability) of the motion information indicated by a change in shape, color, or the like of each part of the operator. This means that the motion information and the detection accuracy information can be determined based on the shape, color, or the like of each part of the operator without using the skeleton.

The image generation section 120 changes the display state of the image displayed on the display section 190 based on the detection accuracy information about the motion information about the operator.

For example, when the object control section 114 controls the object, the image generation section 120 changes the display state of the object based on the detection accuracy information about the motion information. Specifically, when the object control section 114 controls the object so that the object moves or makes a motion based on the motion information about the operator, the image generation section 120 changes the display state of the object that moves or makes a motion based on the motion information based on the detection accuracy information about the motion information. The object that moves or makes a motion based on the motion information about the operator may be a two-dimensional object or a three-dimensional object.

The image generation section 120 performs at least one of a process that blurs the object (blur filter process), a process that displays the object becoming almost transparent (process that changes the α-value), and a process that changes the color of the object (process that changes the color of the object to a color close to the target color), as the detection accuracy indicated by the detection accuracy information decreases. Alternatively, the image generation section 120 may perform at least one of a process that changes the brightness (luminance) of the object, a process that changes the display state (width or depth) of the contour of the object, a process that changes the size of the object, and a process that changes an effect applied to the object, as the detection accuracy of the motion information decreases.

When the detection accuracy information acquisition section 206 has acquired the detection accuracy information in which the detection accuracy decreases as a given part (e.g., hand or foot) of the operator approaches another part (e.g., chest, head, or the other hand or foot) of the operator, the image generation section 120 may perform at least one of a process that blurs the object, a process that displays the object becoming almost transparent, and a process that changes the color of the object, and may perform a process that changes the size of the object, as a given part of the operator approaches another part of the operator. This makes it possible to allow the operator to intuitively determine that the detection accuracy has decreased since the given part of the operator has approached another part of the operator.

The object may be a hand object that moves or makes a motion based on the motion of the hand of the operator, and the image generation section 120 may change the display state of the hand object based on the detection accuracy information about the motion information, for example. Note that the object is not limited to the hand object, but may be an object that moves or makes a motion based on the motion of another part of the operator.

When the object is an operation target object that is operated by the operator, the image generation section 120 changes the display state of the operation target object based on the detection accuracy information about the motion information. The operation target object is an object used to issue an operation instruction to a visual instrument or a game device, for example. Specifically, the operation target object is an object that is used to issue at least one of a content (e.g., video or channel) selection instruction, an instrument operation (e.g., volume) selection instruction, and a content play/record (e.g., play, stop, fast-forward, rewind, or record) instruction to a visual instrument or a game device.

The object control section 114 limits or prohibits the operation of the operator on the operation target object when the detection accuracy indicated by the detection accuracy information has decreased. For example, the object control section 114 limits or prohibits the operation of the operator on the operation target object when the detection accuracy has become lower than a given threshold value. The object control section 114 allows the operation of the operator on the operation target object when the detection accuracy indicated by the detection accuracy information has increased. For example, the object control section 114 allows the operation of the operator on the operation target object when the detection accuracy has become higher than a given threshold value.

The object control section 114 may increase the number of candidate objects of the operation target object as the detection accuracy indicated by the detection accuracy information decreases. For example, when the detection accuracy of the motion information is low, the number of candidate objects of the operation target object increases as compared with the case where the detection accuracy of the motion information is high, and the operator can select the operation target object from the candidate objects.

The detection accuracy information acquisition section 206 acquires the detection accuracy information in which the detection accuracy of the motion information decreases as a given part (e.g., hand or foot) of the operator approaches another part (e.g., chest, head, or the other hand or foot) of the operator. Specifically, the detection accuracy information acquisition section 206 acquires the detection accuracy information in which the detection accuracy decreases when the given part cannot be distinguished from another part. Alternatively, the detection accuracy information acquisition section 206 acquires the detection accuracy information in which the detection accuracy of the motion information decreases when the operator is positioned at a distance equal to or greater than a given distance from the image sensor. Specifically, the detection accuracy information acquisition section 206 acquires the detection accuracy information in which the detection accuracy decreases when the operator is positioned away from the image sensor, and it is impossible (or very difficult) to acquire the motion information from the image information from the image sensor.

2. Method

The method according to one embodiment of the invention is described in detail below.

2.1 Reliability Information

A game device or a visual instrument (e.g., television set or record/reproduction instrument) is normally configured so that the operator (user) performs an instruction operation using a button or a lever of a controller (remote controller). A game device or the like may be configured so that a controller includes a motion sensor (six-axis sensor), and the operator performs an instruction operation by moving the controller.

However, a game device or the like that utilizes such an operation interface requires a controller for performing an operation, and cannot implement an operation that directly reflects a gesture (e.g., hand (arm) movement) made by the operator.

In order to deal with this problem, one embodiment of the invention employs an operation interface that detects an operation input performed by the operator based on image information captured by an image sensor.

Figure 3A:
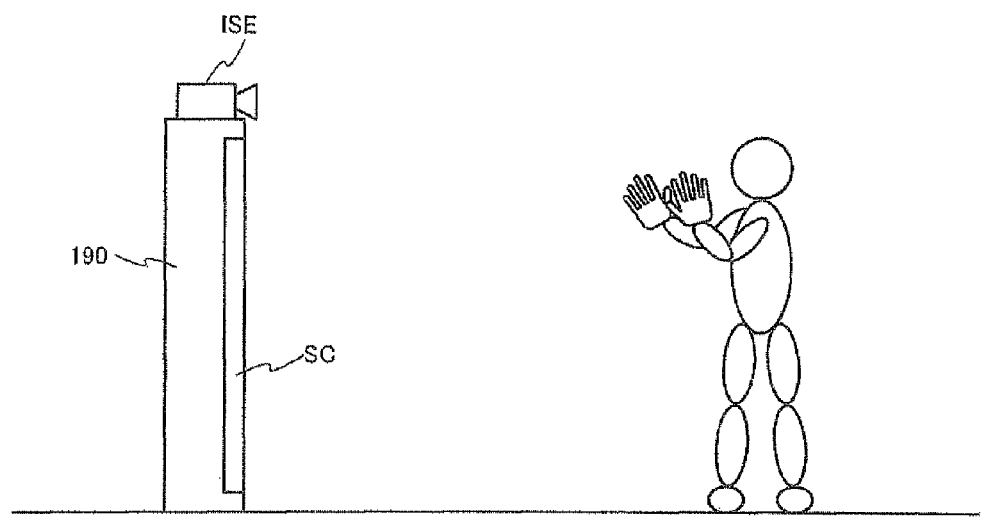
FIGS. 3A and 3B are views illustrative of an operation interface according to one embodiment of the invention that utilizes imaging information from an image sensor.

In FIG. 3A, an image sensor ISE that is implemented by a depth sensor (e.g., infrared sensor) and a color image sensor (RGB sensor (e.g., CCD or CMOS sensor)) is installed at a position corresponding to the display section 190 (screen SC). The image sensor ISE is installed so that its imaging direction (optical axis direction) coincides with the direction from the display section 190 to the operator, for example. The image sensor ISE acquires (captures) color image information and depth information about the operator viewed from the display section 190. The image sensor ISE may be provided in the display section 190, or may be provided as an external element (component). The installation position of the image sensor ISE is not limited to the position shown in FIG. 3A. The image sensor ISE may be installed at an arbitrary position (e.g., lower area of the display section 190).

Figure 3B:
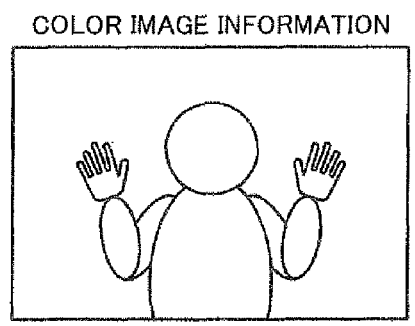
Figure 3B:
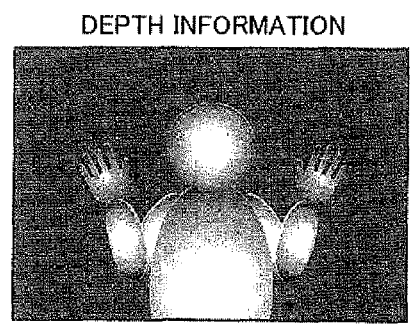

Color image information and depth information shown in FIG. 3B are acquired using the image sensor ISE shown in FIG. 3A. For example, the color image information includes color information about the operator and his surroundings. The depth information includes the depth values of the operator and his surroundings as grayscale values, for example. The color image information may be image information in which the color value (RGB) is set to each pixel position, and the depth information may be image information in which the depth value is set to each pixel position, for example. Note that the image sensor ISE may be a sensor in which the depth sensor and the color image sensor are separately provided, or may be a sensor in which the depth sensor and the color image sensor are integrated.

The depth information may be acquired by a known method. For example, the depth information is acquired by emitting light (e.g., infrared radiation) from the image sensor ISE (depth sensor), and detecting the reflection intensity or the time of flight of the emitted light to detect the shape of the object (e.g., operator) viewed from the position of the image sensor ISE. The depth information is indicated by grayscale data (e.g., an object positioned near the image sensor ISE is bright, and an object positioned away from the image sensor ISE is dark).

Note that the depth information may be acquired in various ways. For example, the depth information (i.e., information about the distance from the object) may be acquired simultaneously with the color image information using a CMOS sensor or the like. The depth information may also be acquired using a distance sensor (ranging sensor) or the like that utilizes ultrasonic waves, for example.

In one embodiment of the invention, skeleton information that specifies the motion of the operator (player or user) viewed from the image sensor ISE is acquired based on the image information from the image sensor ISE. Reliability information that indicates the reliability of the skeleton information is also acquired.

Figure 4:
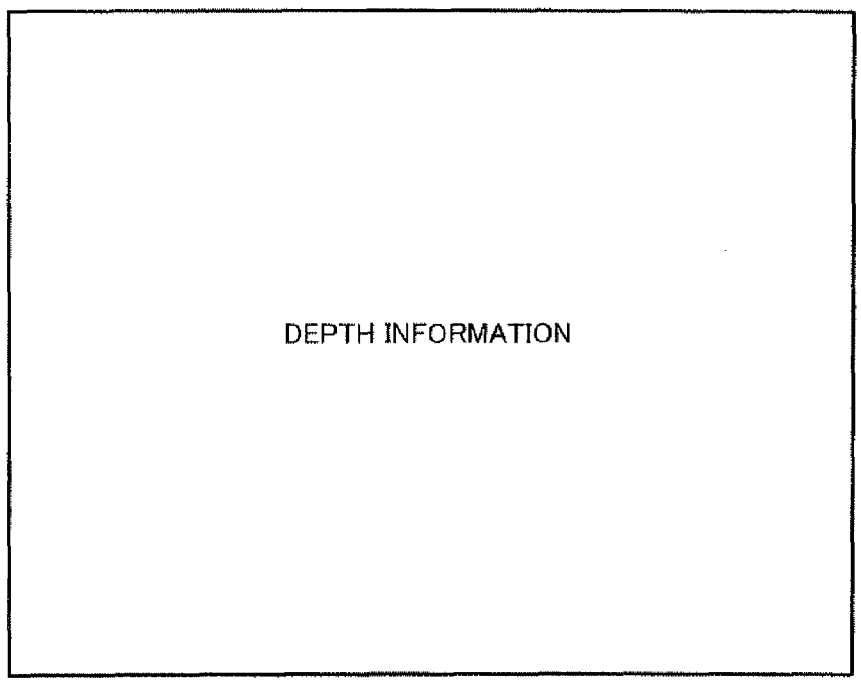
Figure 4:
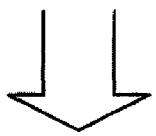
Figure 4:
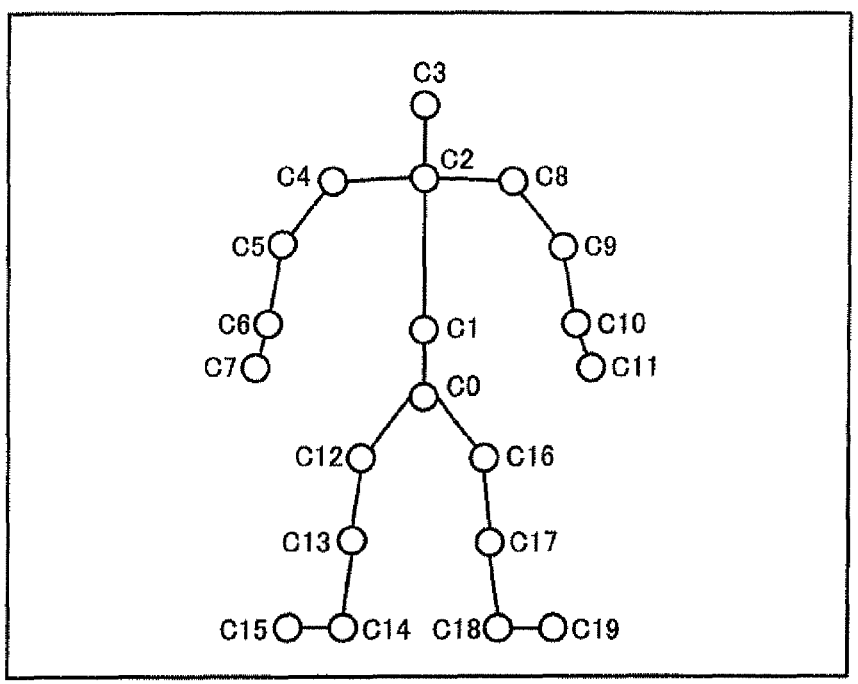

As shown in FIG. 4, the skeleton information used to specify the motion of the operator is acquired based on the information shown in FIG. 3B and the like. In FIG. 4, position information (three-dimensional coordinates) about bones of a skeleton has been acquired as position information about joints C0 to C19. The bones of the skeleton correspond to the parts (e.g., hand, foot, and chest) of the operator captured by the image sensor ISE, and the joints C0 to C19 correspond to the joints of the operator captured by the image sensor ISE.

For example, the three-dimensional shape of the operator or the like viewed from the image sensor ISE can be acquired using the depth information shown in FIG. 3B. The area of each part (e.g., face) of the operator can be specified by face image recognition or the like when using the color image information in combination with the depth information. Therefore, each part of the operator and the joint position of each part are estimated based on the three-dimensional shape information, the motion vector (optical flow) of the image, and the like. The three-dimensional coordinate information about the joint position of the skeleton is calculated based on the two-dimensional coordinates of the pixel position of the depth information corresponding to the estimated joint position, and the depth information set to the pixel position to acquire the skeleton information shown in FIG. 4. More specifically, a plurality of models that differ in body shape and physique are provided. A matching process is performed on the body shape/physique of the operator and the body shape/physique of the plurality of models using the depth information and the color image information about the operator obtained using the image sensor ISE to specify a model having a body shape/physique similar to that of the operator. The joint position (i.e., the position of the bone/part) of the operator is estimated using the information about the joint position of the specified model or the like to acquire the skeleton information.

The motion of the operator can be specified in real time by utilizing the skeleton information, so that a novel operation interface environment can be implemented. Moreover, the skeleton information has high compatibility with the motion data about the character disposed in the object space. Therefore, the character (avatar) corresponding to the operator can be caused to make a motion in the object space by utilizing the skeleton information as the motion data about the character, for example.

However, the operator make various motions, and each operator has a different body shape/physique. Moreover, the operator may be positioned outside the imaging range of the image sensor ISE. Accordingly, it is difficult to acquire skeleton information with a reliability of 100%. In order to deal with this problem, when it is impossible to completely track each bone (part) of the skeleton of the operator, the position (joint position) of the bone is presumed, and reliability (i.e., reliability of prediction) is linked to the position of the bone obtained by prediction, for example.

FIG. 5A shows an example of the data structure of the skeleton information (motion information in a broad sense). The skeleton information shown in FIG. 5A includes position information linked to each bone (joint). The position information about each bone (joint) refers to three-dimensional coordinate information in the camera coordinate system of the image sensor ISE, for example. Each bone (joint) is linked to each part of the operator. For example, bones C0, C1, and C2 are linked to the waist, the chest, and the neck, respectively. Each bone (joint) may be linked to each part using the bone number (joint number) or the like.

FIG. 5B shows an example of the data structure of the reliability information (detection accuracy information in a broad sense). As shown in FIG. 5B, the reliability information includes reliability that is linked to each bone (joint) of the skeleton indicated by the skeleton information. The reliability indicates the reliability of information about each bone. Specifically, the skeleton information includes the position information about each bone linked to each part of the operator (see FIG. 5A), and the reliability information shown in FIG. 5B includes the reliability of the relationship between each part and each bone (joint) of the operator, the reliability of the position information about each bone (joint) of the operator, and the like. Note that the terms "bone" and "joint" may be used interchangeably taking account of the relationship between the bones and the joints.

Figure 6A:
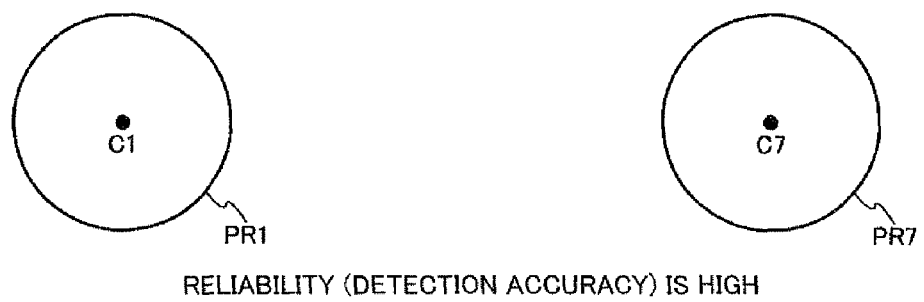
FIGS. 6A and 6B are views illustrative of reliability and an existence probability range.

In FIG. 6A, the joints C1 and C7 are positioned at a long distance. Note that PR1 and PR7 indicate existence probability ranges of the joints C1 and C7. For example, when the joints C1 and C7 are located at positions shown in FIG. 6A at one measurement timing, it is expected that the joints C1 and C7 are positioned within the existence probability ranges PR1 and PR7 at the next measurement timing. The above existence probability concept is used when presuming the skeleton information by the tracking the bone. When the joints C1 and C7 are positioned at a long distance as shown in FIG. 6A, the information (i.e., the relationship with the part and the position information) about the joints C1 and C7 has high reliability (detection accuracy) since the existence probability ranges PR1 and PR7 do not overlap.

Figure 6B:
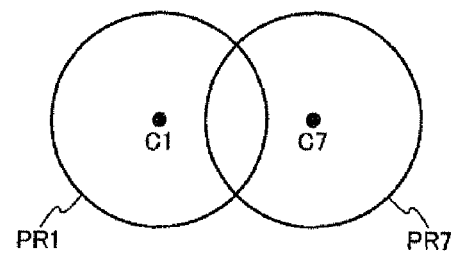

In FIG. 6B, the joints C1 and C7 are positioned at a short distance, and the existence probability ranges PR1 and PR7 overlap. In this case, the joint C1 may be determined to be joint C7 (or the joint C7 may be determined to be joint C7) at the next measurement timing. Therefore, erroneous determination may be made when presuming the skeleton information by the tracking the bone. Accordingly, the information (i.e., the relationship with the part and the position information) about the joints C1 and C7 has low reliability (detection accuracy) as compared with the case shown in FIG. 6A.

Figure 7A:
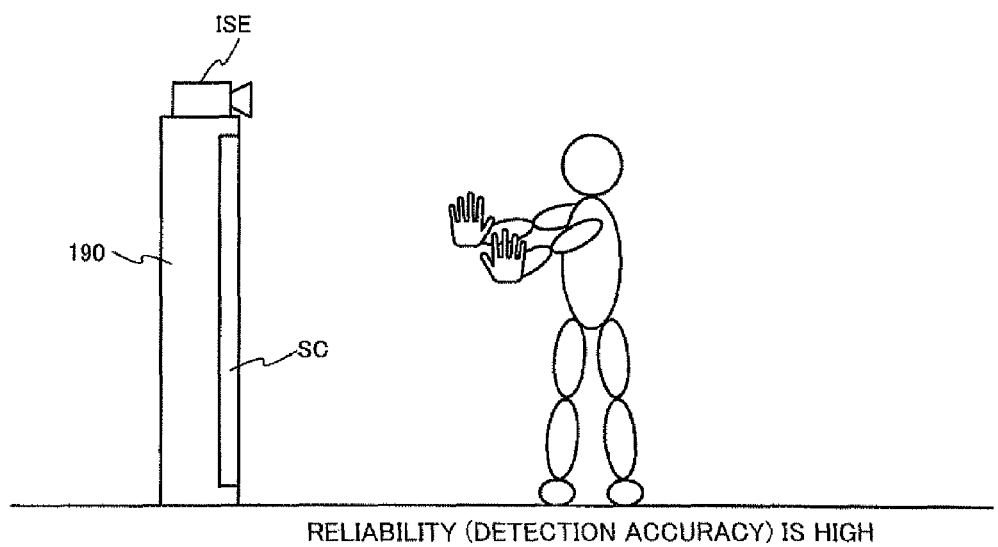
FIGS. 7A and 7B are views illustrative of reliability.

In FIG. 7A, the operator is positioned at an appropriate distance from the image sensor ISE. Therefore, the image information (e.g., resolution) obtained by the image sensor ISE has high reliability, and the skeleton information (motion information) obtained based on the image information also has high reliability (detection accuracy).

Figure 7B:
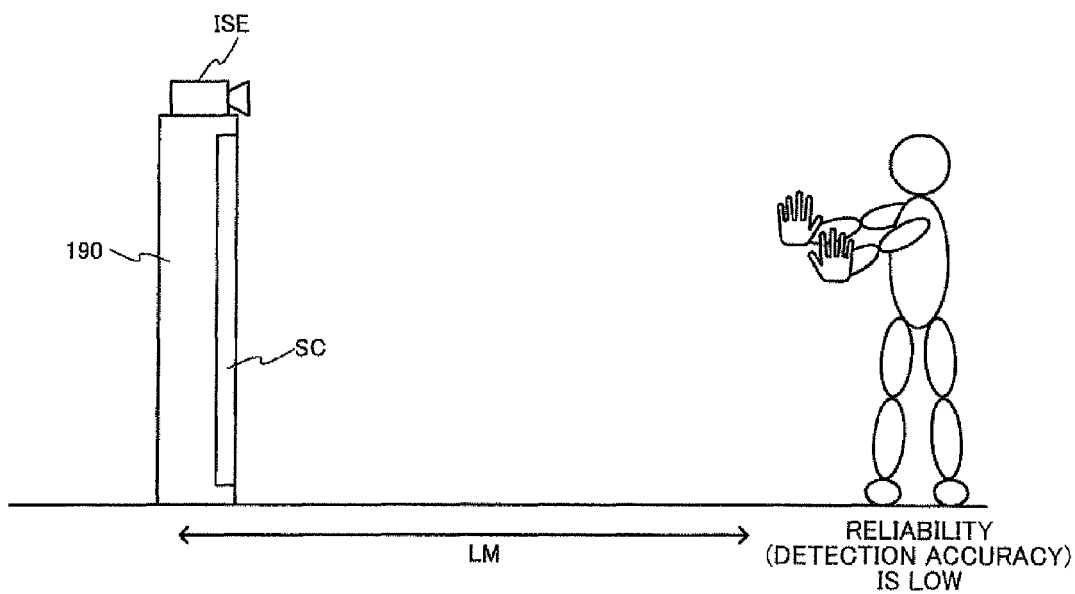

In FIG. 7B, the operator is positioned at a distance equal to or greater than a given distance (allowable distance) LM from the image sensor ISE. Therefore, the image information obtained by the image sensor ISE has low reliability, and the skeleton information (motion information) obtained based on the image information also has low reliability (detection accuracy).

As described above, the reliability information (detection accuracy information) used in connection with one embodiment of the invention indicates lower reliability (detection accuracy) as a given part (e.g., hand or foot) of the operator approaches another part (e.g., chest, waist, head, or the other hand or foot) (see FIGS. 6A and 6B). The reliability information indicates low reliability (detection accuracy) when the operator is positioned at a distance equal to or greater than the given distance LM (e.g., 4 to 5 m) from the image sensor ISE (see FIGS. 7A and 7B). Note that the reliability information (detection accuracy information) is not limited thereto. For example, the reliability information may be configured so that the recognition accuracy of the operator decreases when another person has approached recognition, so that the reliability (detection accuracy) of the skeleton information (motion information) about the operator decreases. In one embodiment of the invention, the skeleton information about a given number of (e.g., two) operators can be detected at the same time, for example. When the number of operators captured by the image sensor ISE has exceeded the given number (e.g., three or more operators have been captured by the image sensor ISE), it may be determined that the reliability (detection accuracy) has decreased since it may be difficult to accurately determine (recognize) the skeleton information about each operator.

According to one embodiment of the invention, an image is generated using the above reliability information (detection accuracy information), and displayed on the display section 190. Specifically, the display state of the image displayed on the display section 190 is changed based on the reliability information (detection accuracy information), or the object control process or the game calculation process is performed based on the reliability information (detection accuracy information), and an image generated based on the result of the object control process or the game calculation process is displayed on the display section 190. A specific example of the image generation method based on the reliability information (detection accuracy information) is described below.

2.2 Display State Change Process Based on Reliability Information and Detection Accuracy Information In one embodiment of the invention, the display state of an image is changed based on the reliability information. Alternatively, the motion information about the operator (player or user) viewed from the image sensor ISE is acquired based on the image information from the image sensor ISE. The detection accuracy information about the motion information is also acquired. The display state of an image is changed based on the acquired detection accuracy information.

An example in which the display state of an image is changed based on the reliability information is mainly described below. Note that the display state of an image may also be changed based on the detection accuracy information about the motion information, or the like. In this case, the motion information may be optical flow information, information that indicates the motion of the operator, skeleton information about the operator, or the like. When the motion information is the skeleton information, the reliability information about the skeleton information may be used as the detection accuracy information.

Figure 8A:
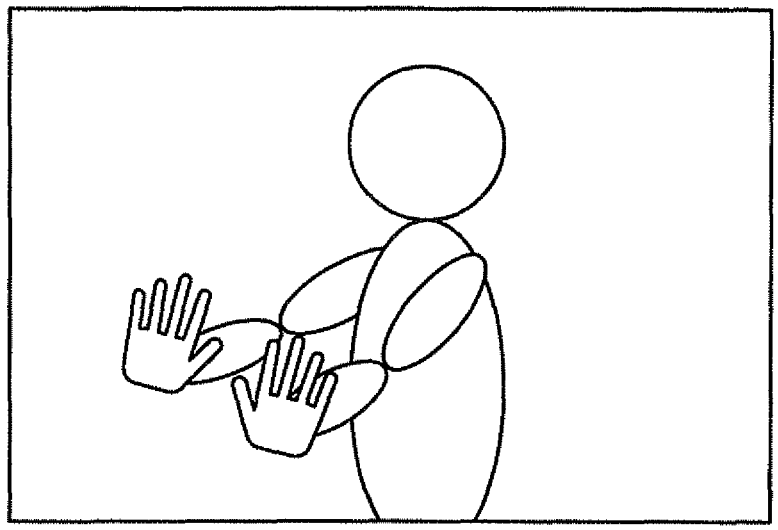
FIGS. 8A and 8B are views showing an operation motion made by an operator.
Figure 8B:
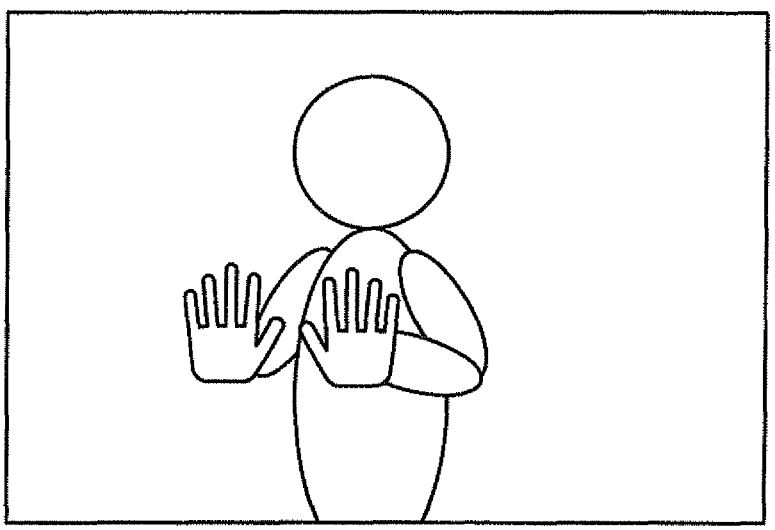

FIGS. 8A and 8B are views showing a state in which the operator stands in front of the display section 190 (see FIG. 3A), and inputs the operation information by making a body motion. In FIG. 8A, the operator inputs the operation information by moving the hands (arms) in a state in which the hands are positioned at a distance from the trunk. In FIG. 8B, the operator inputs the operation information by moving the hands (arms) in a state in which the hands are positioned close to the trunk.

In FIG. 8A, since the joint of the hand is positioned away from the joint of the chest (shoulder) as shown in FIG. 6A, the reliability of the information about the joint of the hand (i.e., the detection accuracy of the motion information about the hand) is high. Therefore, the position information about the hand or the like has high reliability. In FIG. 8B, since the joint of the hand is positioned close to the joint of the chest (shoulder), the reliability of the information about the joint of the hand (i.e., the detection accuracy of the motion information about the hand) is low. Therefore, the position information about the hand or the like has low reliability as compared with FIG. 8A. Specifically, the position information about the chest may be erroneously determined to be the position information about the hand.

When the operator has input the operation information in a state shown in FIG. 8B instead of a state shown in FIG. 8A, the system may erroneously recognize the operation of the operator. Specifically, the operation recognized by the system may not coincide with the intended operation of the operator.

Figure 9A:
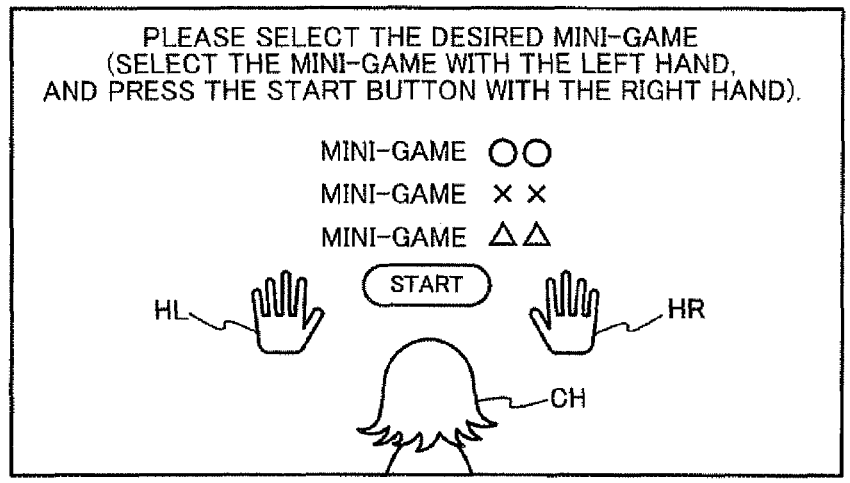
FIGS. 9A and 9B are views illustrative of a method that changes a display state of an image based on reliability information.
Figure 9B:
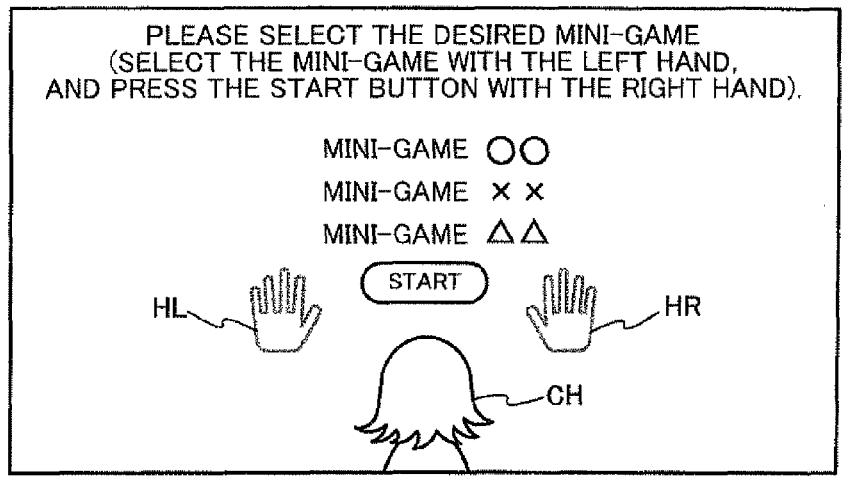

In one embodiment of the invention, in order to notify the operator that the operation state is inappropriate as shown in FIG. 8B, the display state of an image is changed based on the reliability information (detection accuracy information about the motion information), as shown in FIGS. 9A and 9B.

In FIG. 9A, HR and HL indicate hand objects (icon or cursor) displayed on the display section 190 corresponding to the hands (given parts in a broad sense) of the operator. CH indicates an object of a character (avatar) corresponding to the operator.

When the operator has moved the hands as shown in FIG. 8A, the hand objects HR and HL shown in FIG. 9A move (or make a motion) based on the movement (motion) of the hands of the operator. For example, when the operator has moved the right hand around, the right hand object HR moves on the screen in the same manner as the right hand of the operator. When the operator has moved the left hand around, the left hand object HL moves on the screen in the same manner as the left hand of the operator. The operator selects a desired mini-game, or selects "START", by thus moving the hand objects HR and HL.

FIG. 9A shows an example of an image displayed when the hands are positioned away from the trunk (see FIG. 8A), and FIG. 9B shows an example of an image displayed when the hands are positioned close to the trunk (see FIG. 8B).

When the reliability of the skeleton information (i.e., the detection accuracy of the motion information) is considered to be high (see FIG. 8A), the hand objects HR and HL are clearly displayed (see FIG. 9A). When the reliability of the skeleton information (i.e., the detection accuracy of the motion information) is considered to be low (see FIG. 8B), the hand objects HR and HL are blurred, or displayed almost transparently (see FIG. 9B). Alternatively, the color of the hand objects HR and HL is changed to a pale color or the like.

Specifically, the hand objects HR and HL (objects in a broad sense) corresponding to the hands (given parts) are blurred, displayed almost transparently, or changed in color as the reliability of the information about the bone of the hand of the operator (i.e., the reliability of the information about the bone corresponding to a given part) decreases. Alternatively, the hand objects HR and HL corresponding to the hands (given parts) are blurred, displayed almost transparently, or changed in color, as the detection accuracy of the information about the hands of the operator decreases.

The hand objects HR and HL may be blurred by applying blur filtering or the like to the hand objects HR and HL. Specifically, the hand objects HR and HL may be blurred by utilizing a linear texture filtering method (i.e., a blur process using biliner filtering), box filter sampling (i.e., a multi-texture blur process that uses a plurality of textures at the same time), or the like. The hand objects HR and HL may be displayed almost transparently by changing the α-value of the hand objects HR and HL to an α-value that indicates an almost transparent state. The hand objects HR and HL may be changed in color by changing the color of the hand objects HR and HL to a color close to the target color.

Note that the display state of the hand objects HR and HL may be changed by another method. For example, the brightness (luminance) of the hand objects HR and HL may be changed, or the display state of the contour of the hand objects HR and HL may be changed, or the size of the hand objects HR and HL may be changed, or an effect applied to the hand object HR and HL may be changed as the reliability of the skeleton information (i.e., the detection accuracy of the motion information) decreases. For example, the brightness of the hand objects HR and HL may be decreased, or the depth or the width of the contour of the hand objects HR and HL may be decreased, or the size of the hand objects HR and HL may be increased or decreased as the reliability (detection accuracy) decreases. Alternatively, a visual effect similar to that obtained by the above process may be implemented by utilizing an effect applied to the hand objects HR and HL. For example, a fog effect may be superimposed on the objects HR and HL (icons) so that the visibility of the objects HR and HL decreases as the reliability (detection accuracy) decreases. This may achieve the above effect of blurring the objects HR and HL, for example. Alternatively, another object (icon) may be superimposed on the objects HR and HL (icons) as the reliability (detection accuracy) decreases. This may achieve the above effect of blurring the objects HR and HL, for example. Alternatively, an effect image (e.g., balloon or icon) that indicates a decrease in reliability (detection accuracy) may be superimposed on the objects HR and HL (icons) so that the operator is notified of the decrease in reliability (detection accuracy).

Alternatively, the hand objects HR and HL may be deformed based on the reliability of the skeleton information (i.e., the detection accuracy of the motion information). The display state (e.g., the degree of blurring, transparency, or color) of the image of the character CH (avatar) shown in FIGS. 9A and 9B may be changed based on the reliability of the skeleton information (i.e., the detection accuracy of the motion information). An icon object that indicates a decrease in reliability (detection accuracy) may be displayed when the reliability of the skeleton information (i.e., the detection accuracy of the motion information) has decreased.

It is possible to easily notify the operator of a decrease in reliability (detection accuracy) of the hand operation by thus changing the display state of the hand objects HR and HL based on the reliability (detection accuracy). For example, when the hands are positioned close to the trunk (see FIG. 8B), the hand objects HR and HL are blurred as shown in FIG. 9B. The operator who has observed the display state of the hand objects HR and HL stretches the arms as shown in FIG. 9A. Therefore, the operator inputs the operation information by moving the hands in a state in which the reliability of the skeleton information (i.e., the detection accuracy of the motion information) is high (FIG. 8A), so that a situation in which the operation of the operator is erroneously recognized can be prevented. This makes it possible to provide the operator with a comfortable operation interface environment that prevents an erroneous operation and the like.

Figure 10:
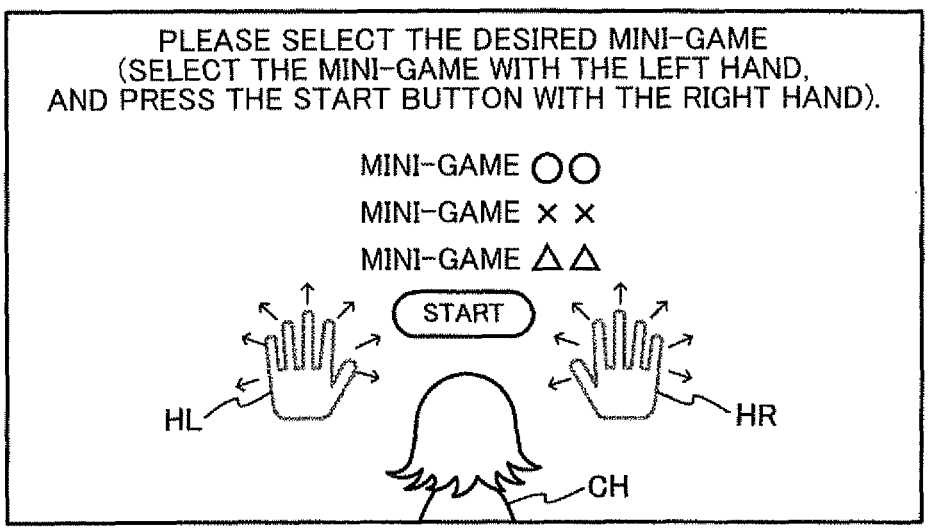
FIG. 10 is a view illustrative of a method that changes the display state of an image based on reliability information.

In FIG. 10, the hand objects HR and HL are blurred, or displayed almost transparently while changing the size of the hand objects HR and HL, based on the reliability of the skeleton information (i.e., the detection accuracy of the motion information). Specifically, the size of the hand objects HR and HL is increased (or may be decreased). In this case, the operator can intuitively determine that the reliability (detection accuracy) has decreased since the hands are positioned near the trunk, so that the hand objects HR and HL are blurred. This makes it possible to implement a display state change process that allows the operator to more intuitively determine a decrease in reliability (detection accuracy).

The image display state change process may not directly use the reliability (detection accuracy). For example, the display state of the image displayed on the display section 190 may be changed based on prediction information (change rate information or slope information) about a change in reliability (detection accuracy) indicated by the reliability information (detection accuracy information).

Figure 11A:
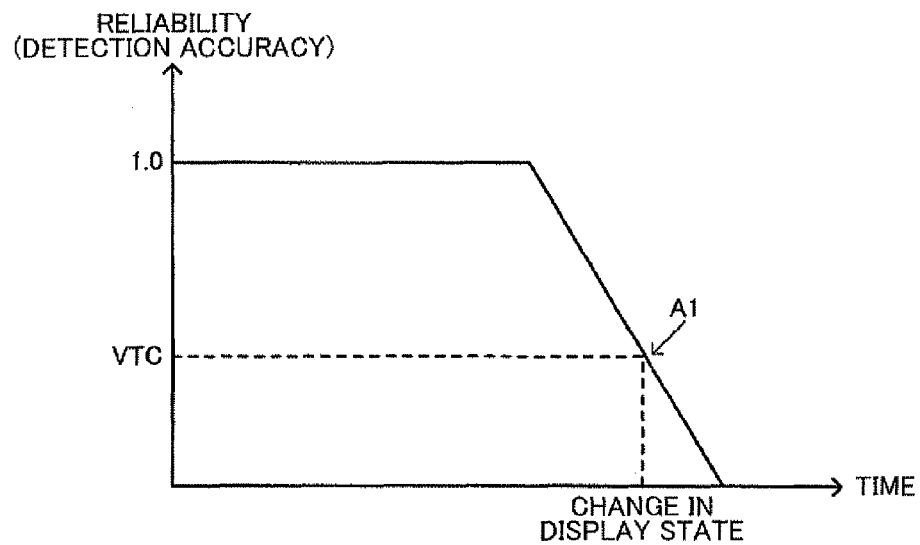
FIGS. 11A and 11B are views illustrative of a method that utilizes reliability change prediction information.

For example, when the reliability (detection accuracy) is lower than a given threshold value VTC, as indicated by A1 in FIG. 11A, the display state of the hand objects HR and HL is changed (see FIG. 9B).

Figure 11B:
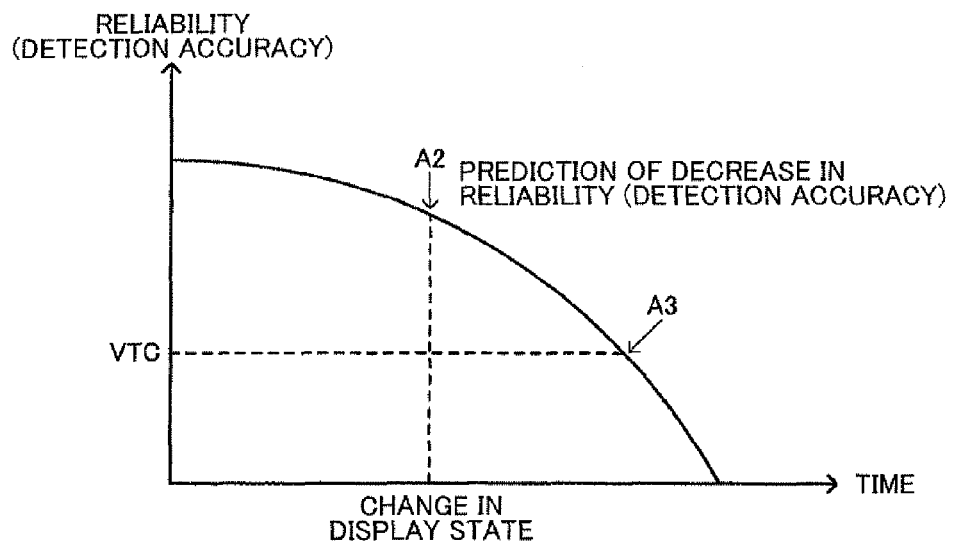

At a point indicated by A2 in FIG. 11B, the reliability (detection accuracy) is not lower than the threshold value VTC, but it is predicted that the reliability (detection accuracy) will decrease to a value smaller than the threshold value VTC based on a change in reliability (detection accuracy). Specifically, it is predicted that the reliability (detection accuracy) will decrease to a value smaller than the threshold value VTC since the reliability (detection accuracy) has decreased rapidly.

In this case, even if the reliability (detection accuracy) is not lower than the threshold value VTC, the display state of the hand objects HR and HL is changed (see FIG. 9B) based on the prediction information about a change in reliability (detection accuracy). Therefore, the operator can determine that the operator has performed an operation that decreases the reliability (detection accuracy) before the reliability (detection accuracy) decreases to a value smaller than the threshold value VTC. In this case, the operator returns the position of the hands to the position shown in FIG. 8A from the position shown in FIG. 8B before the reliability (detection accuracy) decreases to a value smaller than the threshold value VTC, for example. Therefore, the operator can continue the operation in a state in which the reliability of the skeleton information (i.e., the detection accuracy of the motion information) is maintained at a high value, so that a situation in which the operation of the operator is erroneously recognized can be further suppressed. This makes it possible to provide a stable operation interface environment.

Figure 12A:
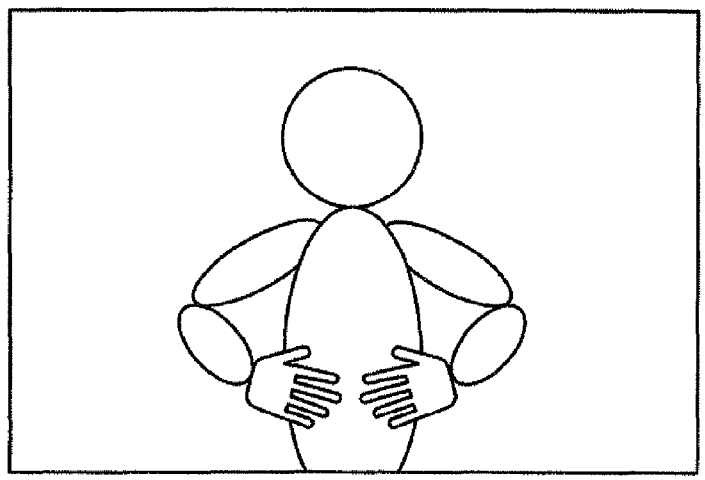
FIGS. 12A and 12B are views illustrative of an object control method based on reliability information.
Figure 12B:
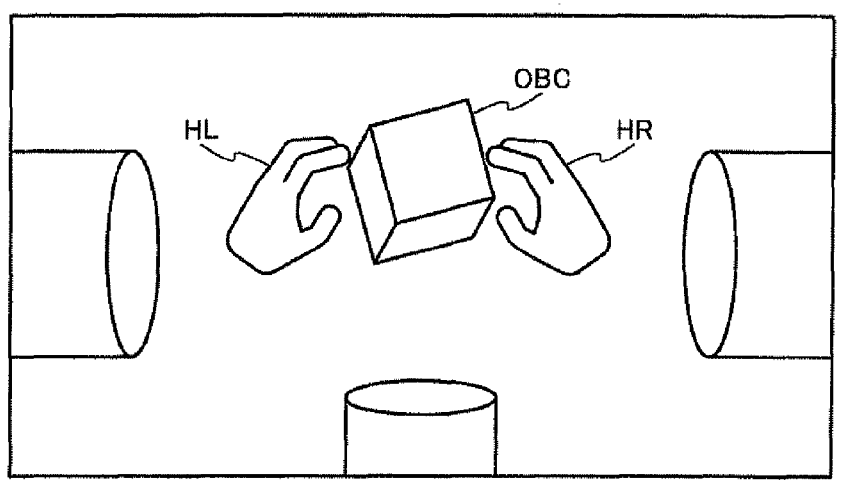

2.3 Object Control Based on Reliability Information and Detection Accuracy Information In one embodiment of the invention, the object may be controlled based on the reliability information (detection accuracy information about the motion information). In FIG. 12A, the operator makes a hold motion with both hands in front of the body. In this case, a game image shown in FIG. 12B is displayed on the display section 190. HR and HL indicate hand objects corresponding to the right hand and the left hand of the operator. When the operator has made a hold motion as shown in FIG. 12A, the hand objects HR and HL move or make a motion based on the hold motion of the operator. The operator enjoys a mini-game by performing an operation that holds an object OBC (operation target) and moves the object OBC in the instructed direction while observing the image shown in FIG. 12B.

In FIG. 12A, the operator does not cross the arms, and the right hand and the left hand are positioned away from the trunk. Therefore, the reliability (detection accuracy) of the information about the bone (joint) corresponding to the hand of the operator is high. In this case, the hand objects HR and HL are clearly displayed (see FIG. 12B). The movement (motion) of the hand objects HR and HL is not limited. The hand objects HR and HL are controlled so that the hand objects HR and HL move or make a motion based on the motion of the hands (given parts) of the operator.

Figure 13A:
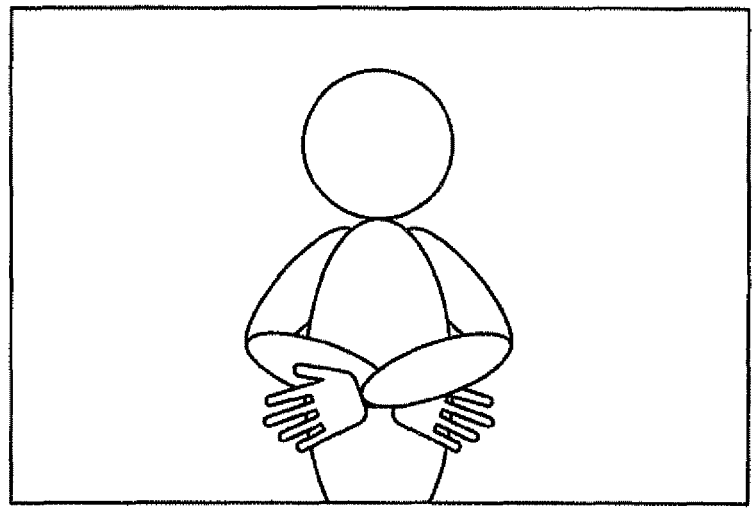
FIGS. 13A and 13B are views illustrative of an object control method based on reliability information.
Figure 13B:
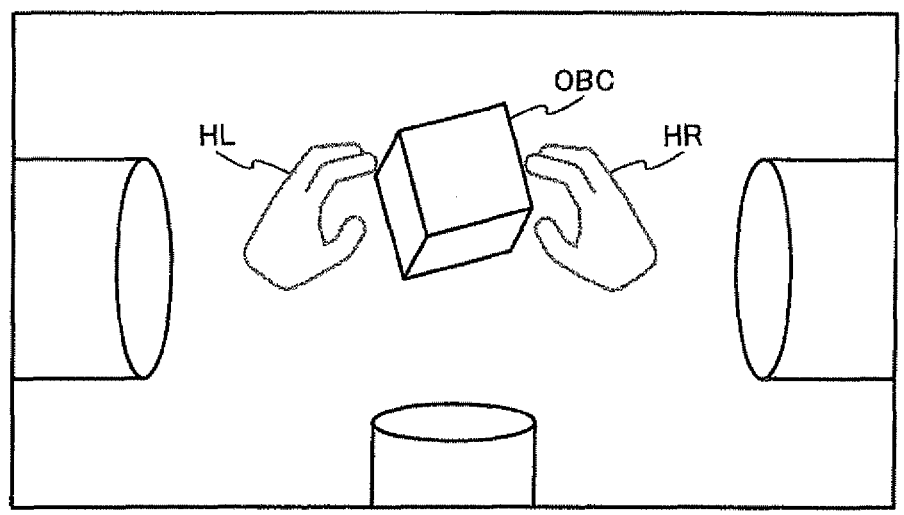

In FIG. 13A, the operator crosses the arms. Therefore, since the existence probability ranges of the hands overlap as shown in FIG. 6B, the reliability (detection accuracy) of the information about the bone (joint) corresponding to the hand of the operator is low. In this case, the hand objects HR and HL are blurred, or displayed almost transparently (see FIG. 13B). Moreover, the movement or the motion of the hand objects HR and HL is limited or stopped. Specifically, the hand objects HR and HL do not move or make a motion even if the operator has moved the hands (i.e., the movement or the motion of the hand objects HR and HL is limited or stopped). Therefore, the operator cannot hold the operation target object OBC (i.e., cannot proceed with the game).

The operator determines that the state of the hands is inappropriate (e.g., the operator crosses the arms (see FIG. 13A) since the hand objects HR and HL are blurred, and do not move when the operator has moved the hands. When the operator has returned the hands to the state shown in FIG. 12A, and moved the hands, the hand objects HR and HL are clearly displayed, and move based on the motion of the hands of the operator. Therefore, the operator can proceed with the game.

According to one embodiment of the invention, when the reliability of the skeleton information (i.e., the detection accuracy of the motion information) is low, the movement or the motion of the object based on the motion of the operator is limited or stopped, as described above. Therefore, the operation of the operator in an inappropriate state is not accepted. This makes it possible to prevent a situation in which the operation of the operator is erroneously recognized so that an unintended operation is performed, or the process of the system fails due to an inappropriate operation.

Figure 14A:
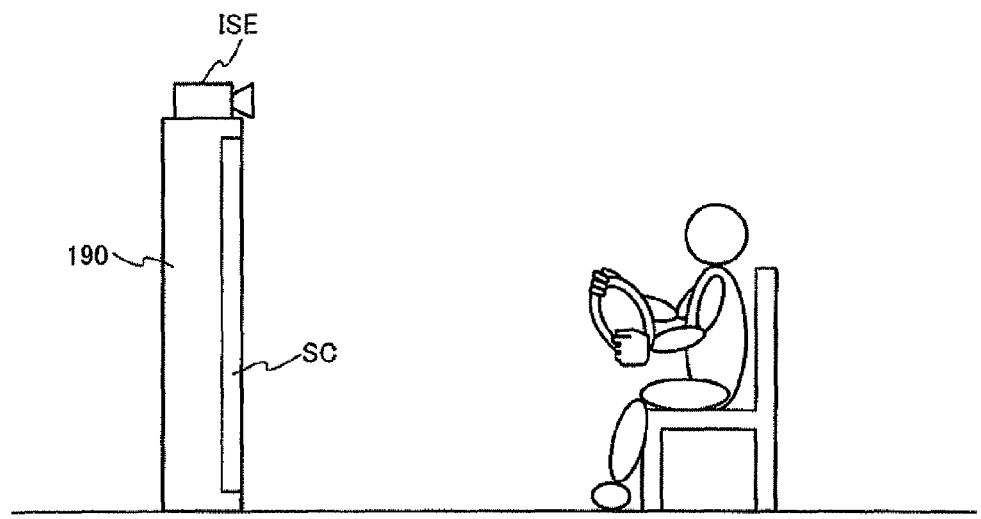
FIGS. 14A and 14B are views illustrative of a method that sets a wait period when limiting the movement or the motion of an object.
Figure 15A:
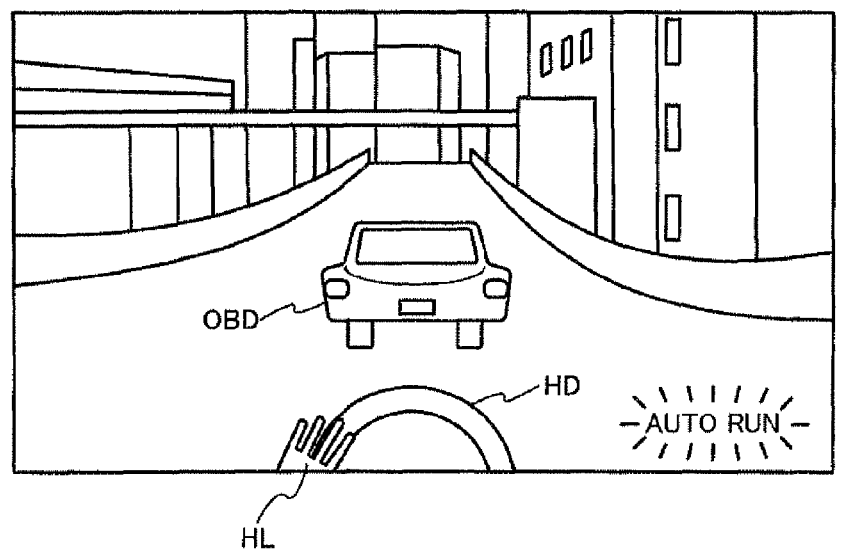
FIGS. 15A and 15B are views illustrative of a method that displays a selection screen and the like after a wait period has elapsed.

In FIG. 14A, the operator holds a steering wheel controller, and plays the game. An image shown in FIG. 15A is displayed on the display section 190. When the operator rotates the steering wheel controller, a steering wheel object HD rotates based on the motion of the operator, and a racing car object OBD turns a corner. The operator can thus enjoy a realistic racing game.

Figure 14B:
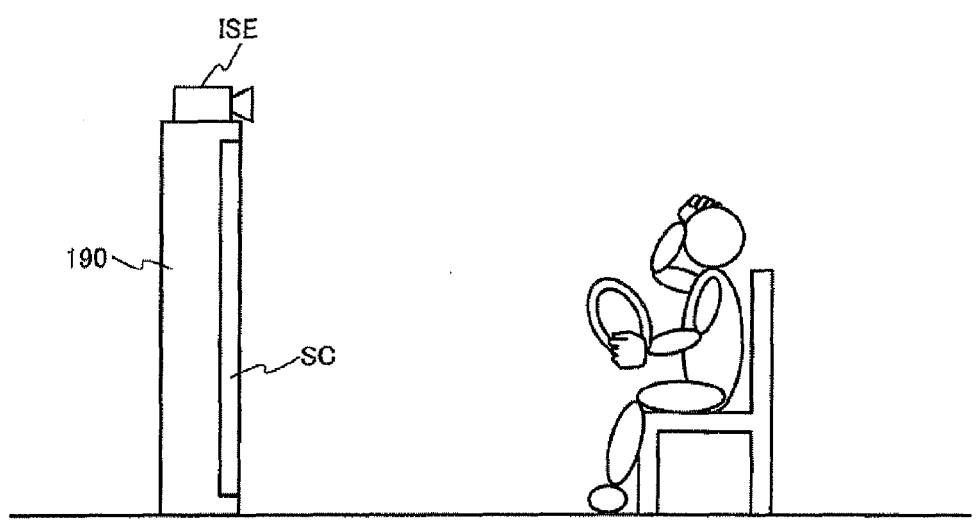

In FIG. 14B, the operator has removed the right hand from the steering wheel controller, and touched the head with the right hand. In this case, since the existence probability ranges overlap as shown in FIG. 6B, the reliability (detection accuracy) of the information about the bone (joint) corresponding to the right hand decreases. The reliability (detection accuracy) also decreases when the operator has temporarily moved away from the image sensor ISE (see FIGS. 7A and 7B).

In FIG. 15A, the movement or the motion of the steering wheel object HD and the racing car object OBD is not limited or stopped until a given wait period elapses. The racing car object OBD automatically travels based on a given algorithm during the wait period. The movement or the motion of the steering wheel object HD and the racing car object OBD is limited or stopped after the wait period has elapsed.

Figure 15B:
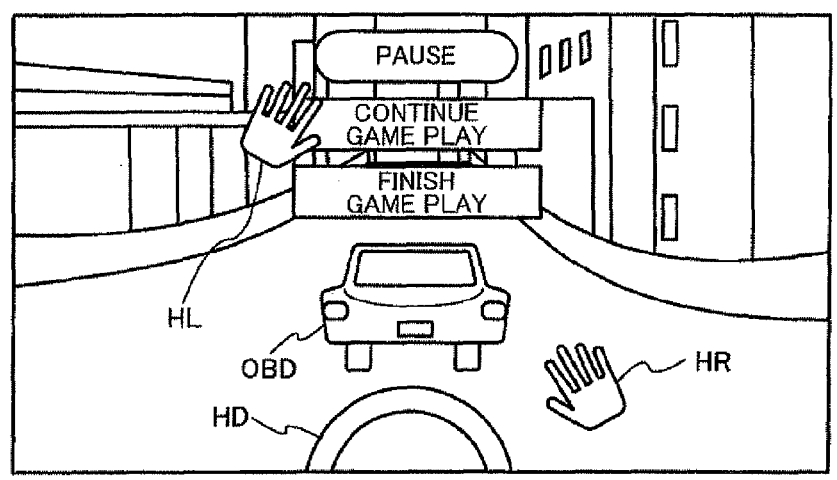

Specifically, the game process is suspended after the wait period has elapsed, and a selection screen shown in FIG. 15B is displayed on the display section 190. The operator can select whether or not to continue to play the game (i.e., whether or not to continue to control the object) using the selection screen. When the operator has selected to continue to play the game, the operator can continue to play the game from the point of suspension by operating the steering wheel controller (see FIG. 14A), for example. When the operator has selected not to continue to play the game, the movement or the motion of the object is limited or stopped, and the game ends.

Since the movement or the motion of the object is not limited or stopped immediately after the reliability (detection accuracy) has decreased, but is limited or stopped after the given wait period has elapsed, the movement or the motion of the object is not limited or stopped even if the operator has made a casual motion such as that shown in FIG. 14B. This makes it possible to implement a smooth game process. It is possible to easily determine whether the motion of the operator is a casual motion such as that shown in FIG. 14B, or a motion that indicates that the operator desires to finish the game play by displaying the selection screen shown in FIG. 15B after the wait period has elapsed, so that a game operation that reflects the intention of the operator can be implemented.

2.4 Game Calculation Process Based on Reliability Information and Detection Accuracy Information In one embodiment of the invention, the game calculation process may be performed based on the reliability information (detection accuracy information about the motion information). Specifically, the game result calculation process or the game process is performed based on the reliability information (detection accuracy information).

Figure 16A:
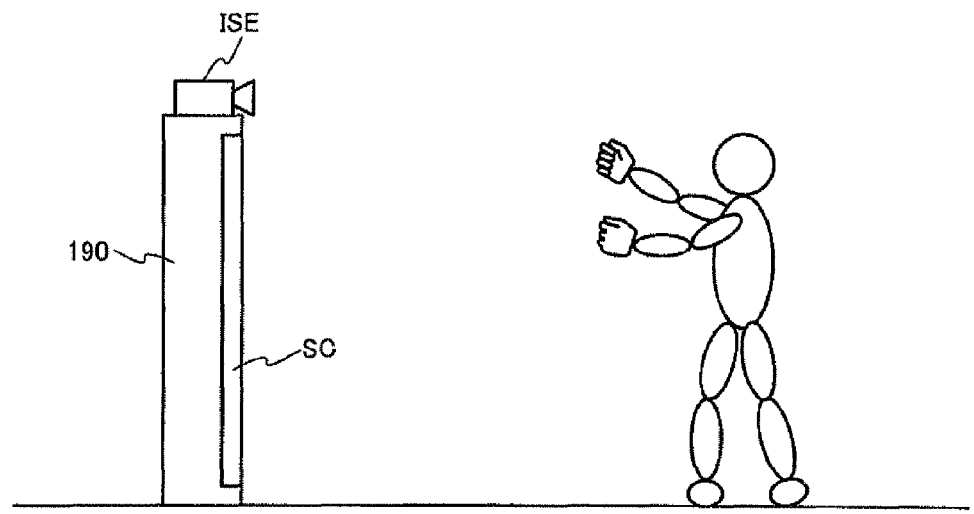
FIGS. 16A and 16B are views illustrative of a game calculation method based on reliability information.
Figure 16B:
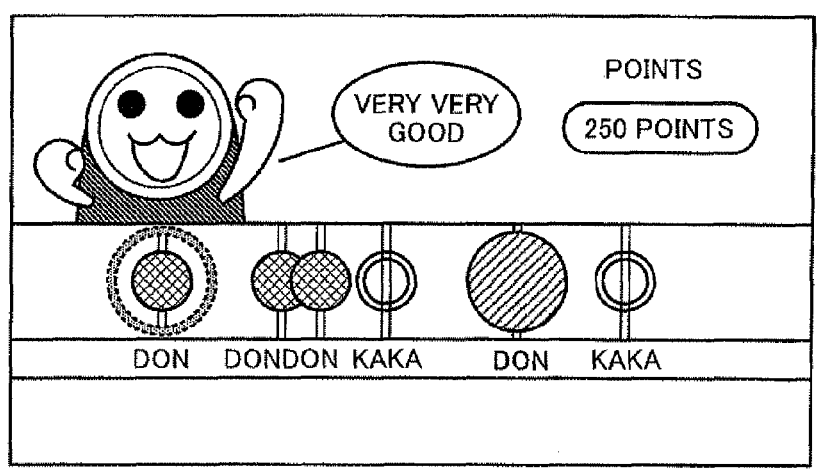

FIGS. 16A and 16B show an example in which the method according to one embodiment of the invention is applied to a music game. In FIG. 16A, the operator plays a drum game, and makes a beating motion with both hands. When the timing of the beating motion of the hand of the operator has coincided with a reference timing (rhythm) of the music output from the game device, the operator makes a score (points are added to the score of the operator).

In FIG. 16A, the operator moves the hands at a position away from the trunk (i.e., makes a beating motion with both hands in a state in which the reliability (i.e., the detection accuracy of the motion information) is high). When the timing of the motion of the hand of the operator has accurately coincided with the reference timing of the music (see FIG. 16B), the operator can make a high score.

Figure 17A:
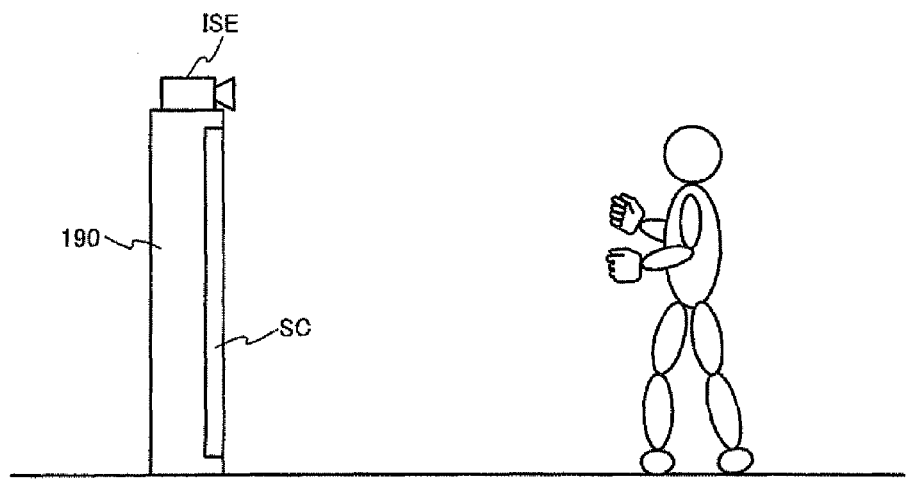
FIGS. 17A and 17B are views illustrative of a game calculation method based on reliability information.
Figure 17B:
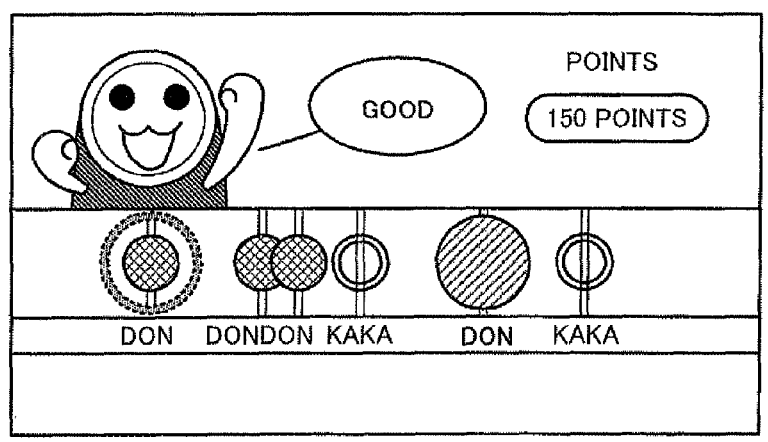

In FIG. 17A, the operator moves the hands at a position close to the trunk (i.e., makes a beating motion with both hands in a state in which the reliability (i.e., detection accuracy) is low). In this case, even if the timing of the motion of the hand of the operator has accurately coincided with the reference timing of the music (see FIG. 17B), the operator makes a low score as compared with FIG. 16B.

In FIGS. 16A to 17B, the game result calculation process is thus performed based on the reliability of the skeleton information (i.e., the detection accuracy of the motion information). For example, the game result calculation process is performed so that the game result obtained when the reliability (detection accuracy) is low (see FIGS. 17A and 17B) is lower than the game result obtained when the reliability (detection accuracy) is high (see FIGS. 16A and 16B). For example, the operator is rated high (VERY VERY GOOD) when the reliability (detection accuracy) is high (see FIGS. 16A and 16B), and is rated lower (GOOD) as compared with FIGS. 16A and 16B when the reliability (detection accuracy) is low (see FIGS. 17A and 17B). According to the above configuration, an operator who has made a correct hand motion at an appropriated position is rated high, so that a situation in which the operation is erroneously recognized can be prevented, and a stable game calculation process can be implemented. Note that the game result calculation process may be performed so that the game result obtained when the reliability (detection accuracy) is low is higher than the game result obtained when the reliability (detection accuracy) is high. Specifically, since the operation information cannot be accurately detected when the reliability (detection accuracy) is low, it is considered that all of the operations performed by the operator may not be completely determined. Points are added to the score of the operator taking this possibility into consideration.

In FIGS. 16A to 17B, the game result calculation process is performed based on the reliability (detection accuracy). Note that the configuration according to one embodiment of the invention is not limited thereto. For example, the game calculation process such as the game process may be performed based on the reliability (detection accuracy). For example, the game process may be performed on condition that the position of the hand of the operator is correct, and may be stopped or limited when the position of the hand of the operator is incorrect. The game that reflects the reliability (detection accuracy) in the game result calculation process is not limited to the music game shown in FIGS. 16A to 17B). The above method may be applied to various games.

2.5 Application Examples of Visual Instrument and the Like

An example in which the method according to one embodiment of the invention is applied to the game device has been mainly described above. Note that the method according to one embodiment of the invention may also be applied to various instruments other than the game device.

Figure 18A:
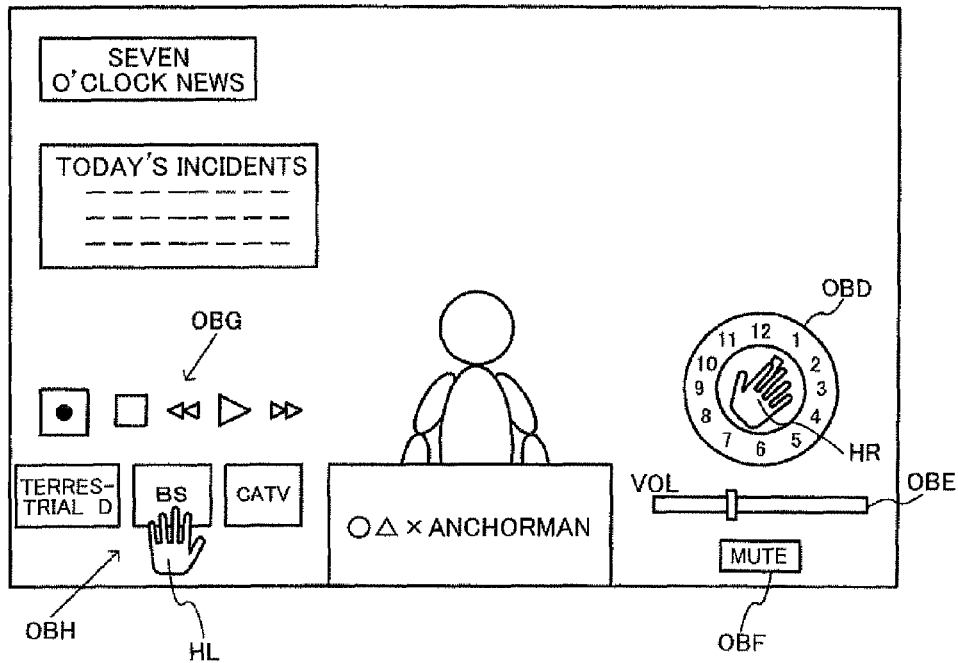
FIGS. 18A and 18B are views illustrative of an example in which a method according to one embodiment of the invention is applied to a visual instrument.

FIG. 18A shows an example in which the method according to one embodiment of the invention is applied to a television set (display device) (i.e., visual instrument). In FIG. 18A, operation target objects OBD, OBE, OBF, OBG, and OBH are operation target objects of the operator. For example, the operation target objects OBD, OBE, OBF, OBG, and OBH are used to issue an operation instruction to the visual instrument (or game device). Specifically, the operation target objects OBD, OBE, OBF, OBG, and OBH are used to issue at least one of a content selection instruction, a given instrument operation instruction, and a content play/record instruction. For example, the operation target objects OBD, OBE, and OBF are operation target objects for channel selection (content selection in a broad sense), a volume operation (instrument operation selection in a broad sense), and a mute operation (instrument operation selection in a broad sense), respectively. The operation target objects OBG and OH are operation target objects for a content play/record operation (e.g., play, stop, fast-forward, rewind, or record) and a broadcasting type selection operation (e.g., terrestrial digital broadcasting or satellite broadcasting), respectively.

When the operator desires to change the channel, the operator stretches the arm toward the display section 190, and moves the hand object HR to the position of the operation target object OBD for a channel operation. The operator then changes the channel by moving (rotating) the hand, and watches the desired broadcast program.

When the operator desires to adjust the volume, the operator stretches the arm toward the display section 190, and moves the hand object HR to the position of the operation target object OBE for a volume operation. The operator then adjusts the volume by moving the hand to the right or left. When the operator desires to mute the sound, the operator stretches the arm toward the display section 190, and moves the hand object HR to the position of the operation target object OBF for a mute operation. The operator then performs a press operation or the like to mute the sound. The operation target objects OBG and OBH may be operated in the same manner as described above.

When the reliability of the skeleton information (i.e., the detection accuracy of the motion information) is high (e.g., the operator stretches the arms without crossing the right hand and the left hand), the operation target objects OBD to OBH and the hand objects HR and HL are clearly displayed on the display section 190, as shown in FIG. 18A.

When the reliability of the skeleton information (i.e., the detection accuracy of the motion information) is high, the operator can operate the operation target objects OBD to OBH by moving the hands or the like. Specifically, the operator can operate the operation target object OBD for a channel operation or the operation target object OBE for a volume operation by rotating the hand or moving the hand to the right or left.

Figure 18B:
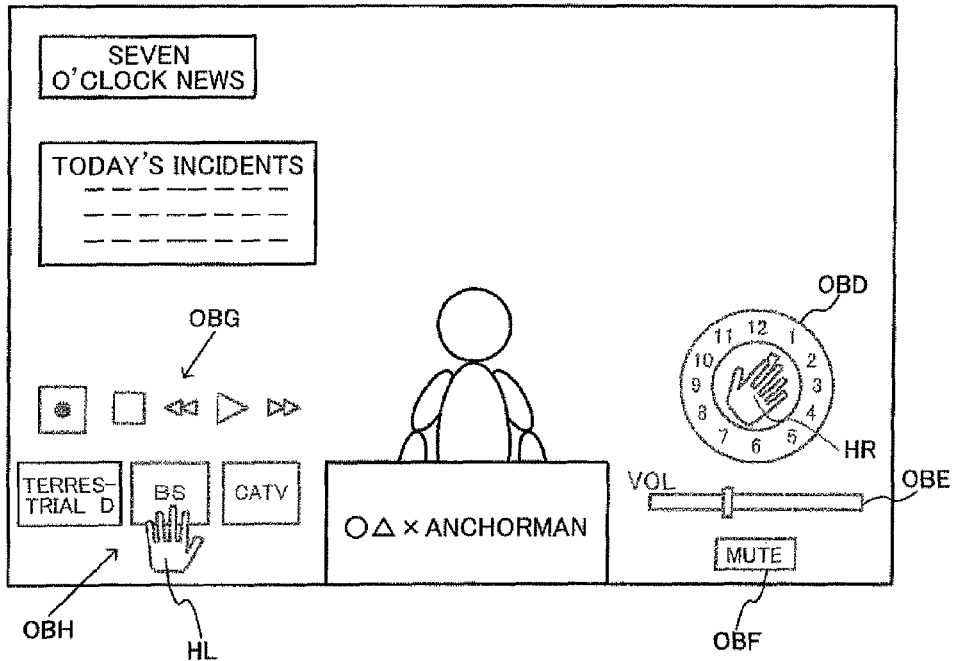

When the reliability of the skeleton information (i.e., the detection accuracy of the motion information) is low (e.g., the hands of the operator are positioned close to the trunk, or the operator crosses the arms), the operation target objects OBD to OBH and the hand objects HR and HL are blurred or displayed (almost) transparently, as shown in FIG. 18B. Specifically, the display state of the operation target objects OBD to OBH and the hand objects HR and HL is changed based on the reliability information (detection accuracy information). When the reliability (detection accuracy) is low, the operation target objects OBD to OBH are blurred or displayed almost transparently. When the reliability (detection accuracy) is low, the display state of the operation target object OBD that comes in contact with the hand object HR in FIG. 18B may be changed. For example, only the display state (e.g., the degree of blurring, transparency or color) of the operation target object OBD is changed without changing the display state of the hand object HR. Therefore, the operator can determine that it is impossible to appropriately operate the operation target object OBD.

When the reliability (detection accuracy) is low, the operation of the operator on the operation target objects OBD to OBH is limited or prohibited. Specifically, the operator cannot operate the operation target object OBD for a channel operation or the operation target object OBE for a volume operation even if the operator rotates the hand or moves the hand to the right or left.

According to the above configuration, the operation target objects OBD to OBH are displayed on the screen (see FIG. 18A) when the operator has stretched the arms, for example, and the operator can perform a content (image or sound) selection operation, an instrument operation, or a content play/record operation by operating the operation target objects OBD to OBH.

When the operator has bent the arms at a position close to the trunk, the operation target objects OBD to OBH are blurred or displayed transparently (see FIG. 18B). Therefore, the operation target objects OBD to OBH are hardly observed on the screen, and the operator can enjoy watching the content (e.g., picture) without being disturbed.

According to one embodiment of the invention, when the reliability of the skeleton information (i.e., the detection accuracy of the motion information) is low, the operation of the operator on the operation target objects OBD to OBH is limited or prohibited. When the reliability (detection accuracy) is high, the operation of the operator on the operation target objects OBD to OBH is allowed. This makes it possible to provide the operator with a novel operation interface environment.

In one embodiment of the invention, the number of candidate objects of the operation target object may be increased as the reliability of the skeleton information (i.e., the detection accuracy of the motion information) decreases. Specifically, when the reliability (detection accuracy) is low, the number of candidate objects of the operation target object is increased as compared with the case where the reliability (detection accuracy) is high.

Figure 19A:
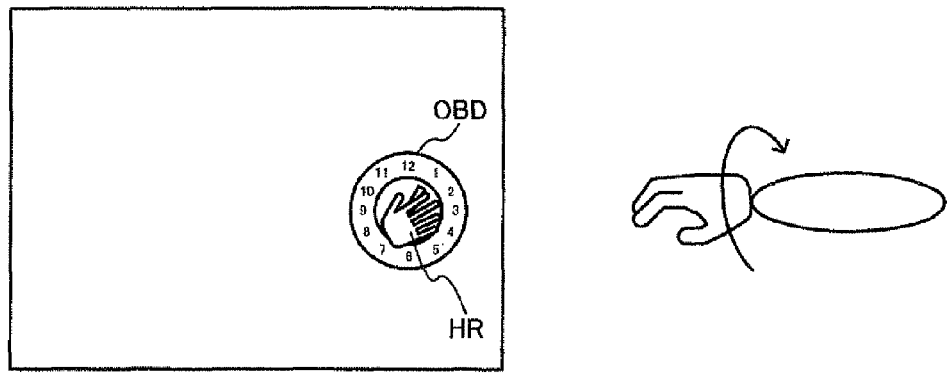
FIGS. 19A to 19C are views illustrative of a method that increases or decreases the number of candidate objects of an operation target object.

In FIG. 19A, the operator stretches the arm forward, and rotates the hand. The reliability (detection accuracy) increases when the hand is positioned away from the rest of the body as shown in FIG. 19A. Since the operator rotates the hand, it is determined that the operator has performed a channel change operation. In this case, the candidate object is only the operation target object OBD, and a channel change operation using the operation target object OBD is performed when the operator has rotated the hand.

Figure 19B:
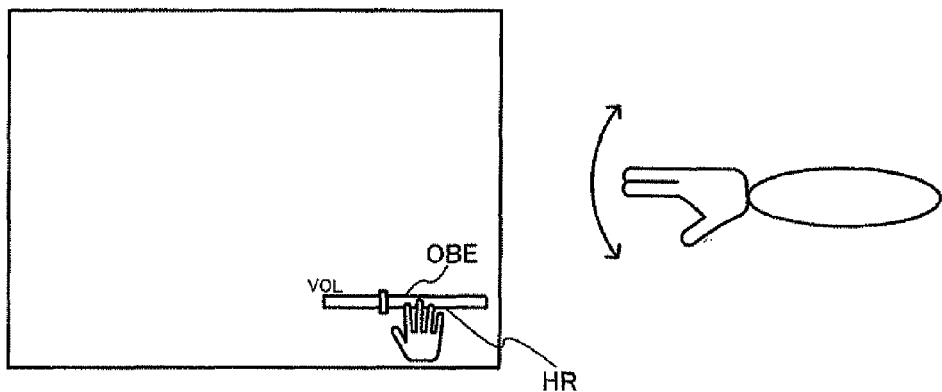

In FIG. 19B, the operator stretches the arm forward, and moves the hand to the right and left. The reliability (detection accuracy) increases when the hand is positioned away from the rest of the body as shown in FIG. 19B. Since the operator moves the hand to the right and left, it is determined that the operator has performed a volume operation. In this case, the candidate object is only the operation target object OBE, and a volume operation using the operation target object OBE is performed when the operator has moved the hand to the right and left.

Figure 19C:
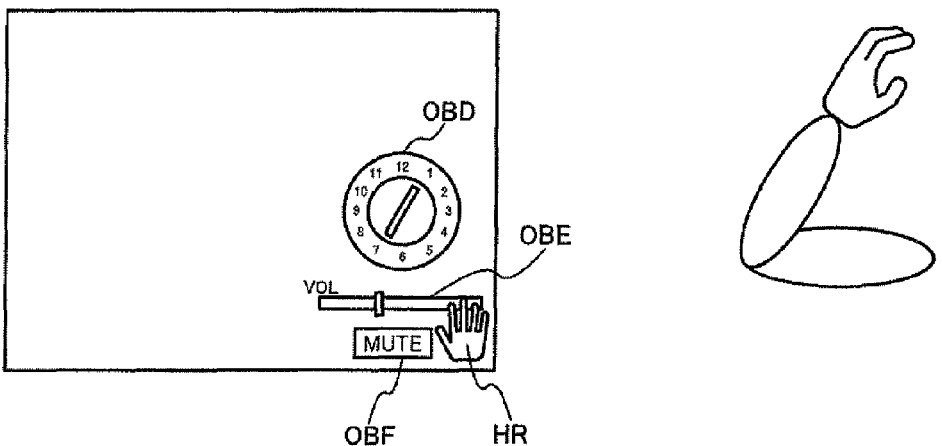

In FIG. 19C, the operator bends the arm. The reliability (detection accuracy) decreases when the hand is positioned close to the rest of the body as shown in FIG. 19C. It cannot be determined that the operator has performed a channel change operation or a volume operation, differing from FIGS. 19A and 19B. In this case, the number of candidate objects of the operation target object is increased as compared with the case where the reliability (detection accuracy) is high (FIGS. 19A and 19B). Specifically, the number of candidate objects of the operation target object is one in FIGS. 19A and 19B. In FIG. 19C, the number of candidate objects of the operation target object is increased to three, for example. The operator can perform the desired operation by adjusting the position of the right hand object HR to the position of the desired object.

Specifically, when the reliability (detection accuracy) is high (see FIGS. 19A and 19B), the channel change operation or the volume operation is selected by one motion of the hand (e.g., rotates the hand, or moves the hand to the right or left). In FIG. 19C, a plurality of candidate objects are displayed, and the operator can perform the desired operation by selecting the operation target object from the candidate objects.

Note that a plurality of candidate motion patterns may be provided as a table corresponding to each correct motion (e.g., rotation motion or sideways motion of the hand) assumed by the system in order to prevent a situation in which erroneous recognition occurs due to an unexpected motion of the operator. In this case, a matching process is performed on the motion of the operator recognized by the image sensor and the plurality of candidate motion patterns to determine whether or not the motion of the operator coincides with the correct motion. In FIG. 19B, the operator may move the hand sideways in order to operate the operation target object OBE by making a first motion pattern in which the operator faces the screen of the display section 190 and moves the hand sideways, or a second motion pattern in which the operator lies down and moves the hand vertically. Therefore, the first motion pattern and the second motion pattern are provided as the candidate motion patterns, and a pattern matching process is performed on the motion of the operator and the candidate motion patterns to determine whether or not the motion of the operator coincides with the correct motion. For example, it is difficult to distinguish a button pressing motion and a holding motion. It is possible to prevent a situation in which a button pressing motion is erroneously recognized as a holding motion providing any possible candidate motion patterns as the button pressing motion, and performing the pattern matching process.

Figure 20A:
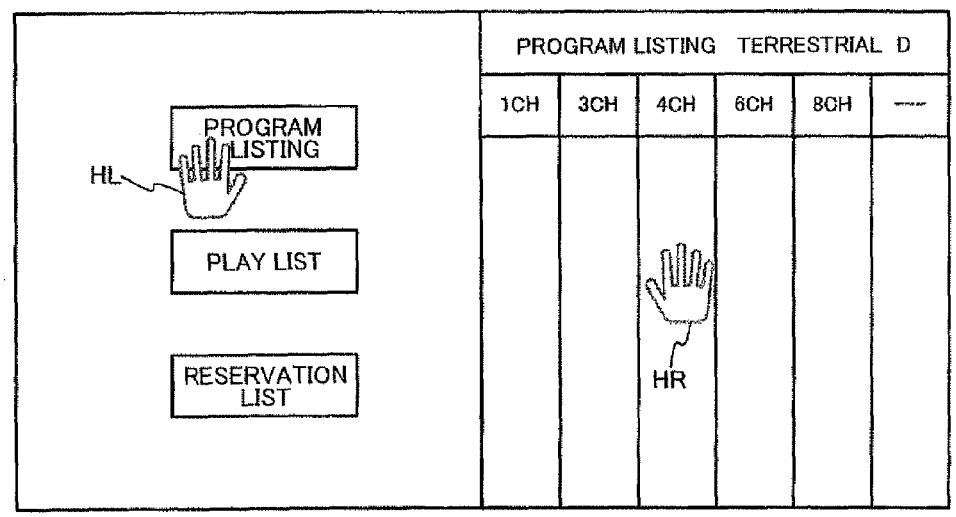
FIGS. 20A and 20B are views illustrative of an example in which a method according to one embodiment of the invention is applied to a visual instrument.
Figure 20B:
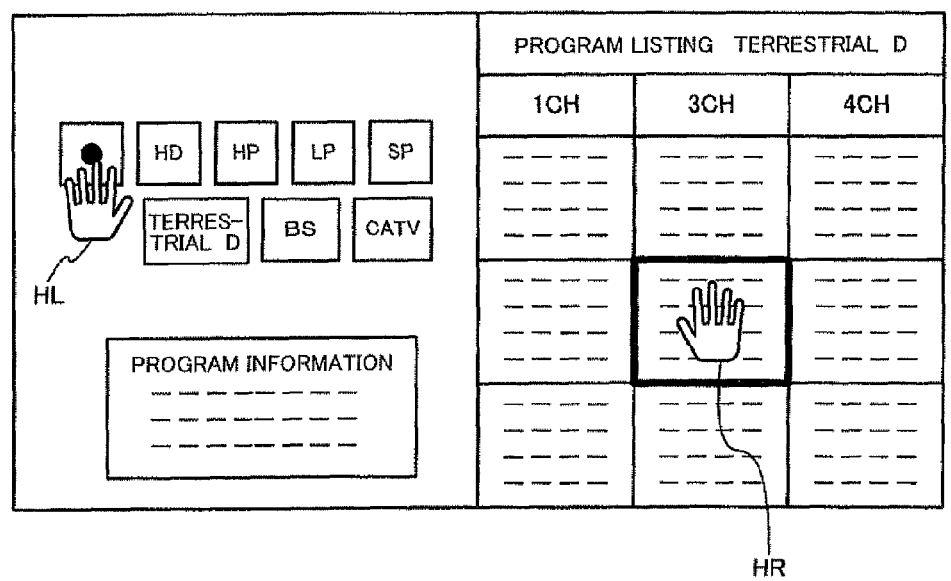

FIGS. 20A and 20B show an example in which the method according to one embodiment of the invention is applied to a record/reproduction instrument (e.g., HDD recorder or DVD recorder) (i.e., visual instrument). As shown in FIG. 20A, when the operator has selected a program listing using the left hand object HL in a state in which the operator does not stretch the arms, an outline of the program listing is displayed. In this case, the hand objects HR and HL are blurred or displayed almost transparently since the reliability (detection accuracy) is low.

In FIG. 20B, since the operator stretches the arms (i.e., the reliability (detection accuracy) is high), the hand objects HR and HL are clearly displayed. The details of the program listing are displayed, and the operator can select a program included in the program listing using the right hand object HR, and select recording of the program using the left hand object HL, for example. The operator can also select the recording image quality (HD, HP, LP, or SP) and the broadcast program type (terrestrial digital broadcasting, satellite broadcasting, or CATV) using the left hand object HL. The details of the program selected using the right hand object HR are also displayed.

According to the above method, a highly convenient operation interface environment can be provided for a visual instrument (e.g., television set or record/reproduction instrument).

2.6 Specific Processing Example

Figure 21:
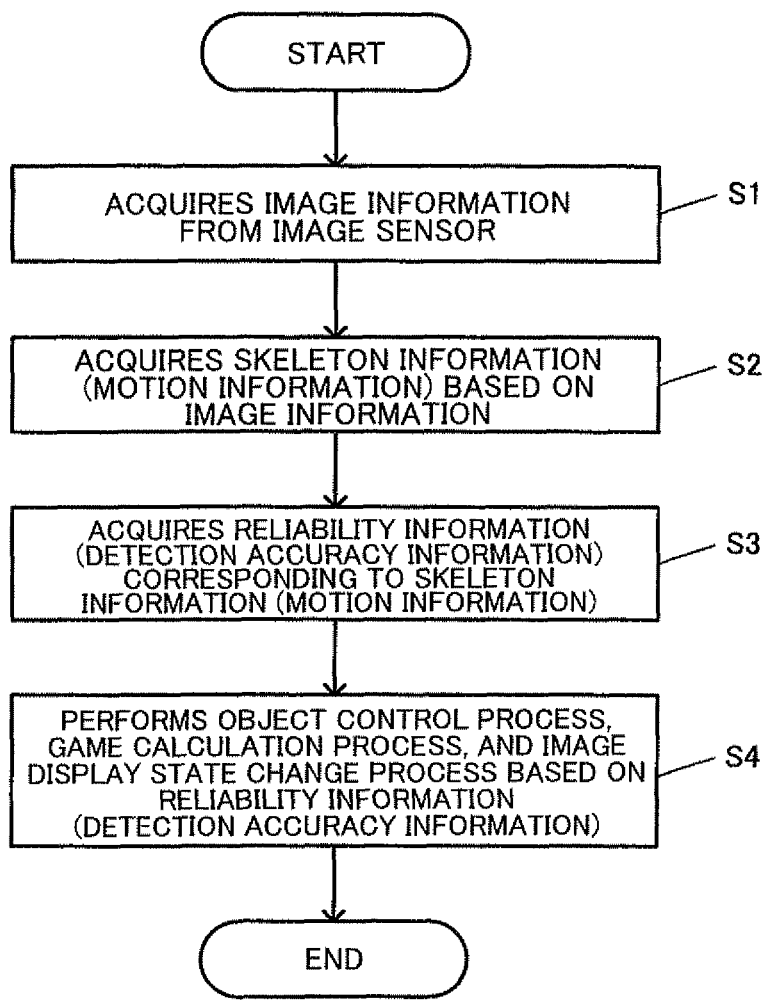
FIG. 21 is a flowchart illustrative of a process according to one embodiment of the invention.

A specific processing example according to one embodiment of the invention is described below with reference to flowcharts shown in FIGS. 21 to 24. FIG. 21 is a flowchart showing the overall process.

The image information is acquired from the image sensor, as described with reference to FIGS. 3A and 3B (step S1). The skeleton information (motion information about the operator) is then acquired based on the image information, as described with reference to FIG. 4 (step S2). The reliability information (detection accuracy information) corresponding to the skeleton information (motion information) is then acquired, as described with reference to FIGS. 5A and 5B (step S3). The object control process, the game calculation process, and the image display state change process are then performed based on the reliability information (detection accuracy information) (step S4).

Figure 22:
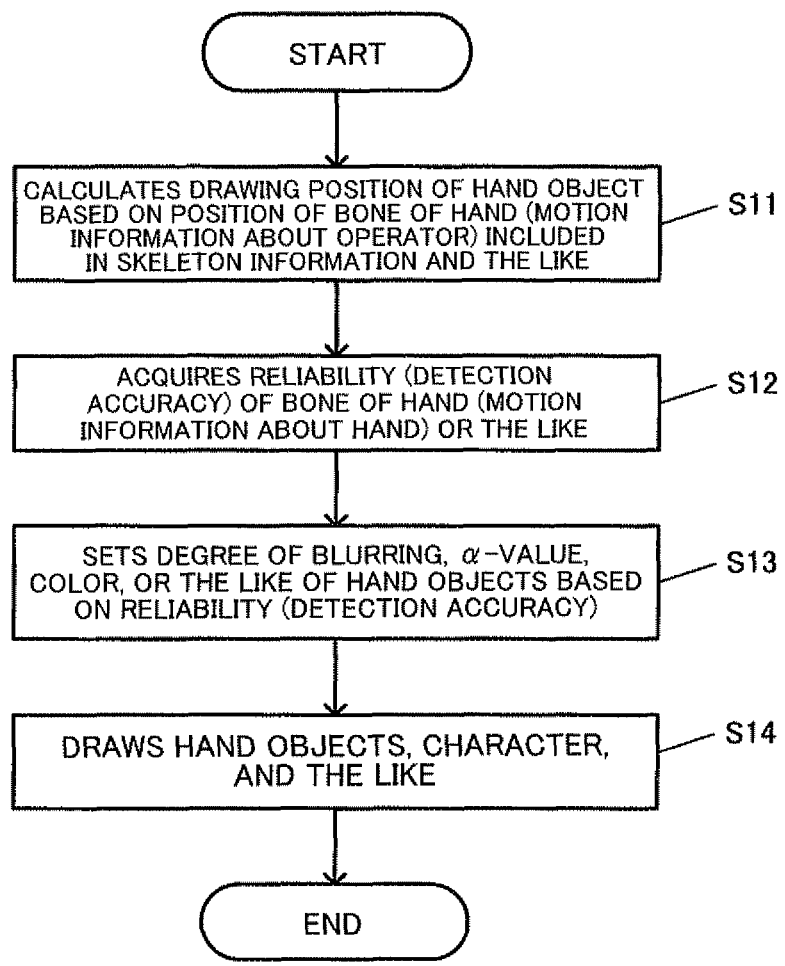
FIG. 22 is a flowchart illustrative of a process according to one embodiment of the invention.

FIG. 22 is a flowchart showing a specific example of the image display state change process using the reliability information (detection accuracy information about the motion information).

The drawing position of the hand object is calculated based on the position (motion information about the operator) of the bone (joint) of the hand included in the skeleton information, and the like (step S11). The reliability (detection accuracy) of the bone of the hand (motion information about the hand) or the like is then acquired (step S12).

The degree of blurring, the α-value, the color, or the like of the hand objects is set based on the acquired reliability (detection accuracy) (step S13). The hand objects, the character, and the like for which the degree of blurring, the α-value, the color, or the like has been set, are then drawn (step S14). The display state of the image can thus be changed as shown in FIGS. 9A and 9B.

Figure 23:
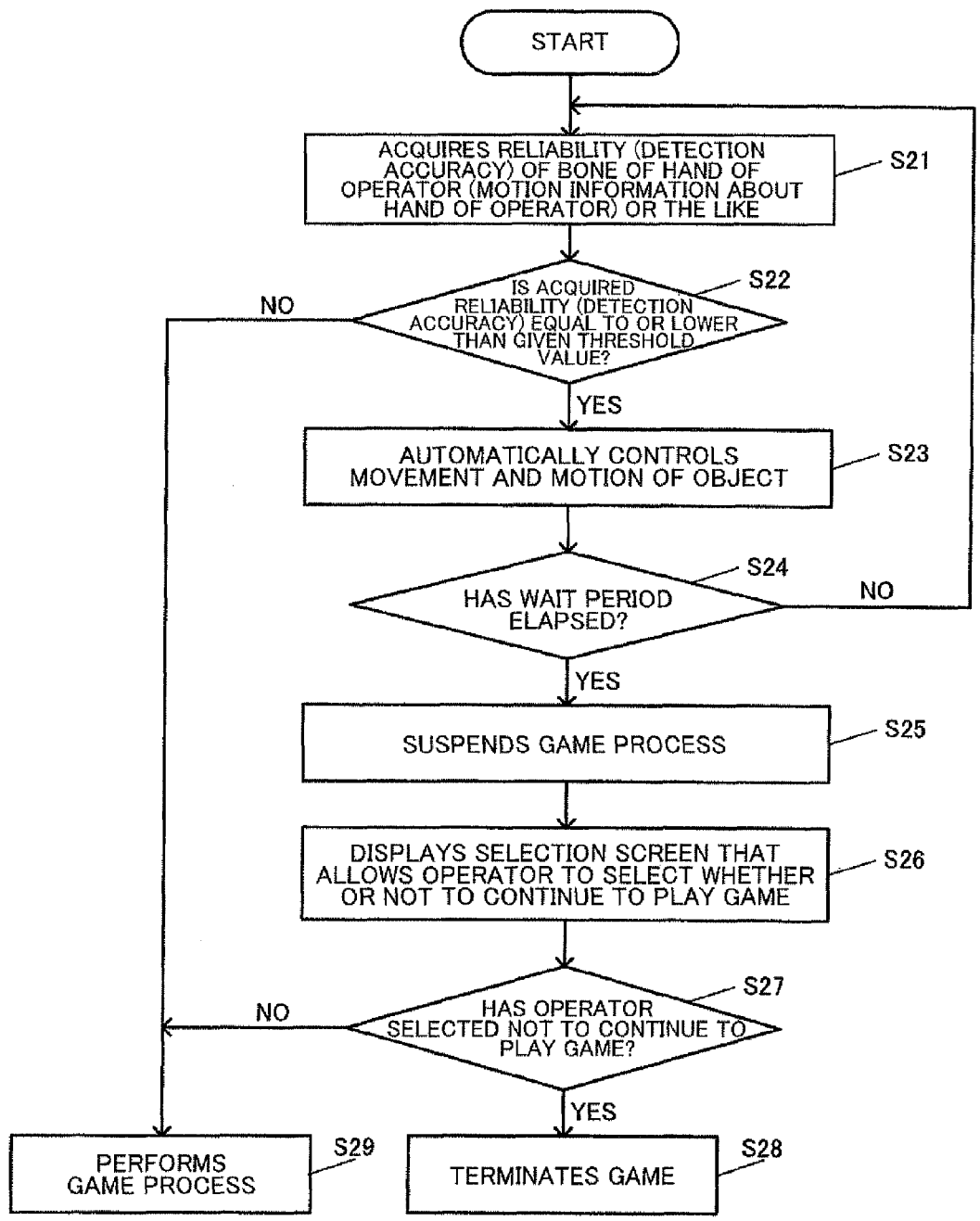
FIG. 23 is a flowchart illustrative of a process according to one embodiment of the invention.

FIG. 23 is a flowchart showing a specific example of the object control process using the reliability information (detection accuracy information about the motion information).

The reliability (detection accuracy) of the bone of the hand of the operator (motion information about the hand of the operator) or the like is acquired (step S21). Whether or not the acquired reliability (detection accuracy) is equal to or lower than a given threshold value is then determined (step S22).

When the reliability (detection accuracy) is equal to or lower than the threshold value, the movement and the motion of the object are automatically controlled, as described with reference to FIG. 15A (step S23). Whether or not a given wait period has elapsed is then determined. When the wait period has not elapsed, the step S21 is performed again. When the wait period has elapsed, the game process is suspended, as described with reference to FIG. 15B (step S25). The selection screen that allows the operator to select whether or not to continue to play the game is then displayed (step S26). Whether or not the operator has selected not to continue to play the game is then determined (step S27). When the operator has selected not to continue to play the game, the game is terminated (step S28). When the operator has selected to continue to play the game, the game process is performed (step S29).

Figure 24:
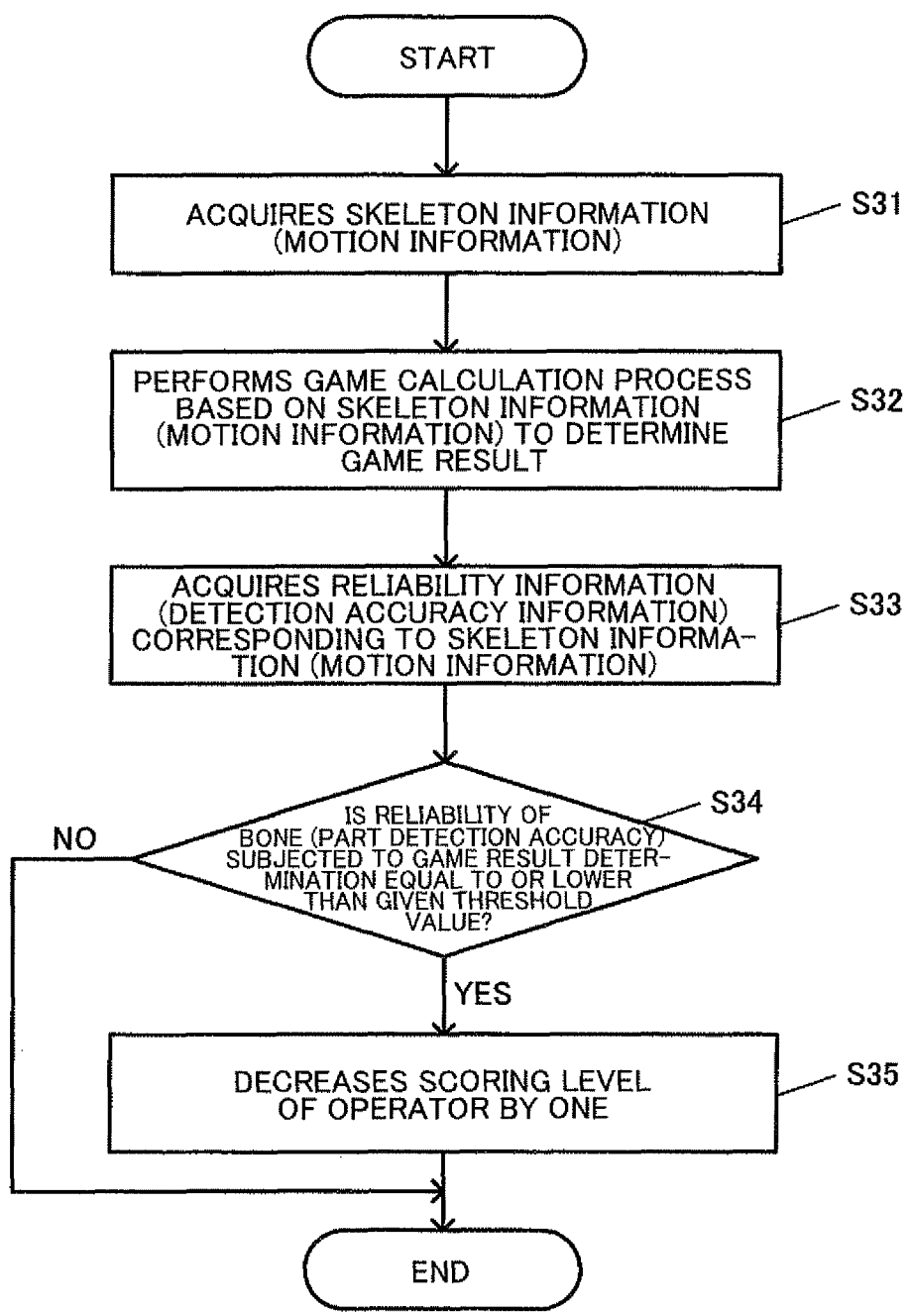
FIG. 24 is a flowchart illustrative of a process according to one embodiment of the invention.

FIG. 24 is a flowchart showing a specific example of the game calculation process using the reliability information (detection accuracy information about the motion information).

The skeleton information (motion information about the operator) is acquired (step S31). The game calculation process is performed based on the acquired skeleton information (motion information) to determine the game result (step S32). The reliability information (detection accuracy information) corresponding to the skeleton information (motion information) is then acquired (step S33). Whether or not the reliability (part detection accuracy) of the bone (joint) subjected to game result determination is equal to or lower than a given threshold value is then determined (step S34). When the reliability (detection accuracy) is equal to or lower than the threshold value, the scoring level of the operator is decreased by one (step S35). This makes it possible to implement a game calculation process that reflects the reliability (detection accuracy).

Although some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term (e.g., skeleton information, reliability information, hand, or hand object) cited with a different term (e.g., motion information, detection accuracy information, given part, or object) having a broader meaning or the same meaning at least once in the specification and the drawings may be replaced by the different term in any place in the specification and the drawings. The skeleton information acquisition method, the reliability information acquisition method, the motion information acquisition method, the detection accuracy information acquisition method, the method of changing the display state of an image, the object control method, the game calculation method, and the like are not limited to those described in connection with the above embodiments. Methods equivalent to the above methods are intended to be included within the scope of the invention. The invention may be applied to various games. The invention may be applied to various image generation systems such as an arcade game system, a consumer game system, a large-scale attraction system in which a number of players participate, a simulator, a multimedia terminal, a system board that generates a game image, a mobile phone, a visual instrument, an audio instrument, and a home electric appliance.

What is claimed is:

1. An image generation system comprising:
   an image information acquisition section that acquires image information from an image sensor;
   a skeleton information acquisition section that acquires skeleton information based on the image information from the image sensor, the skeleton information specifying a motion of an operator;
   a reliability information acquisition section that acquires reliability information that indicates reliability of the skeleton information; and
   an image generation section that generates an image displayed on a display section,
   the image generation section generating an image corresponding to the acquired reliability information as the image displayed on the display section, and
   the reliability information acquisition section acquiring the reliability information in which reliability of information about each bone included in the skeleton information decreases when the operator is positioned at a distance equal to or greater than a given distance from the image sensor.

2. The image generation system as defined in claim 1, a plurality of bones of a skeleton indicated by the skeleton information each having associated reliability information.

3. The image generation system as defined in claim 2, the skeleton information including position information of each of the bones; and
   the reliability information including, for each of the bones, reliability of a relationship between a part of the operator and the bone, and reliability of the position information of the bone.

4. The image generation system as defined in claim 1, the reliability information acquisition section acquiring the reliability information in which reliability of information about a bone corresponding to a given part of the operator decreases as the given part approaches another part of the operator.

5. The image generation system as defined in claim 1, the reliability information acquisition section acquiring the reliability information in which the reliability of the skeleton information decreases as a processing load related to the skeleton information increases.

6. An image generation system comprising:
   an image information acquisition section that acquires image information from an image sensor;
   a skeleton information acquisition section that acquires skeleton information based on the image information from the image sensor, the skeleton information specifying a motion of an operator;
   a reliability information acquisition section that acquires reliability information that indicates reliability of the skeleton information;
   an image generation section that venerates an image displayed on a display section; and
   an object control section that controls an object,
   the image generation section (i) generating an image corresponding to the acquired reliability information as the image displayed on the display section; (ii) changing a display state of the image displayed on the display section based on the reliability information; and (iii) changing a display state of the object based on reliability of information about a bone corresponding to a given part of the operator, the object being displayed on the display section corresponding to the given part of the operator, and
   the image generation section performing at least one of a process that blurs the object corresponding to the given part, a process that displays the object becoming almost transparent, and a process that changes a color of the object, as the reliability of the information about the bone corresponding to the given part decreases.

7. The image generation system as defined in claim 6, the given part being a hand of the operator, and the object being a hand object that moves or makes a motion based on a motion of the hand of the operator.

8. The image generation system as defined in claim 6, the object being an icon that moves based on a motion of the given part of the operator.

9. The image generation system as defined in claim 6, the image generation section changing a display state of an operation target object that is an operation target of the operator based on the reliability information.

10. The image generation system as defined in claim 6, the image generation section changing a display state of the image displayed on the display section based on prediction information about a change in the reliability indicated by the reliability information.

11. An image generation system comprising:
    an image information acquisition section that acquires image information from an image sensor;
    a skeleton information acquisition section that acquires skeleton information based on the image information from the image sensor, the skeleton information specifying a motion of an operator;
    a reliability information acquisition section that acquires reliability information that indicates reliability of the skeleton information;
    an object control section that controls an object; and
    an image generation section that generates an image displayed on a display section, the object control section controlling the object based on the reliability information, and the object control section limiting or stopping at least one of a movement and a motion of the object when the reliability indicated by the reliability information has decreased.

12. An image generation system comprising:

an image information acquisition section that acquires image information from an image sensor;

a motion information acquisition that acquires motion information about an operator based on the image information from the image sensor;

a detection accuracy information acquisition section that acquires detection accuracy information about the motion information;

an image generation section that generates an image displayed on a display section; and an object control section that controls an object, the image generation section performing at least one of a process that blurs the object, a process that displays the object becoming almost transparent, and a process that changes a color of the object, as detection accuracy indicated by the detection accuracy information decreases, and the image generation section changing a display state of the image displayed on the display section based on the detection accuracy information about the motion information about the operator.

13. The image generation system as defined in claim 12, the detection accuracy information acquisition section acquiring the detection accuracy information in which the detection accuracy decreases as a given part of the operator approaches another part of the operator; and the image generation section performing at least one of a process that blurs the object, a process that displays the object becoming almost transparent, and a process that changes the color of the object, and performing a process that changes a size of the object, as the given part of the operator approaches the other part of the operator.

14. An image generation system comprising:

an image information acquisition section that acquires image information from an image sensor;

a motion information acquisition that acquires motion information about an operator based on the image information from the image sensor;

a detection accuracy information acquisition section that acquires detection accuracy information about the motion information;

an image generation section that generates an image displaced on a display section, the image generation section changing a display state of the image displayed on the display section based on the detection accuracy information about the motion information about the operation, and the detection accuracy information acquisition section acquiring the detection accuracy information in which detection accuracy of the motion information decreases when the operator is positioned at a distance equal to or greater than a given distance from the image sensor.

15. An image generation system comprising:

an image information acquisition section that acquires image information from an image sensor;

a motion information acquisition that acquires motion information about an operator based on the image information from the image sensor;

a detection accuracy information acquisition section that acquires detection accuracy information about the motion information;

an object control section that controls an object; and an image generation section that generates an image displayed on a display section, the object control section controlling the object based on the detection accuracy information about the motion information about the operator, the object being an operation target object that is an operation target of the operator, and the object control section limiting or prohibiting an operation of the operator on the operation target object when detection accuracy indicated by the detection accuracy information has decreased.

16. An image generation method comprising:

acquiring image information from an image sensor;

acquiring skeleton information based on the image information from the image sensor, the skeleton information specifying a motion of an operator;

acquiring reliability information in which reliability of information about each bone included in the skeleton information decreases when the operator is position at a distance equal to or greater than a given distance from the image sensor, the reliability information indicating reliability of the skeleton; and generating an image corresponding to the acquired reliability information as an image displayed on a display section.

17. An image generation method comprising:

acquiring image information from an image sensor;

acquiring skeleton information based on the image information from the image sensor, the skeleton information specifying a motion of an operator;

acquiring reliability information that indicates reliability of the skeleton information;

controlling an object based on the reliability information;

generating an image displayed on a display section;

limiting or stopping at least one of a movement and a motion of the object when the reliability indicated by the reliability information has decreased.

18. An image generation method comprising:

acquiring image information from an image sensor;

acquiring motion information about an operator based on the image information from the image sensor;

acquiring detection accuracy information about the motion information;

changing a display state of an image displayed on a display section based on the detection accuracy information about the motion information about the operator; and controlling an object;

changing a display state of the object based on the detection accuracy information about the motion information; and performing at least one of a process that blurs the object, a process that displays the object becoming almost transparent, and a process that changes a color of the object, as detection accuracy indicated by the detection accuracy information decreases.

19. An image generation method comprising:

acquiring image information from an image sensor;

acquiring motion information about an operator based on the image information from the image sensor;

acquiring detection accuracy information about the motion information;

controlling an object based on the detection accuracy information about the motion information about the operator;

generating an image displayed on a display section; and limiting or prohibiting an operation of the operator on the operation target object when detection accuracy indicated by the detection accuracy information has decreased, the object being an operation target object that is an operation target of the operator.

20. An image generation method comprising:

acquiring image information from an image sensor;

acquiring skeleton information based on the image information from the image sensor, the skeleton information specifying a motion of an operator;

acquiring reliability information that indicates reliability of the skeleton information;

generating an image corresponding to the acquired reliability information as an image displayed on a display section;

controlling an object;

changing a display state of the image displayed on the display section based on the reliability information;

changing a display state of the object based on reliability of information about a bone corresponding to a given part of the operator, the object being displayed on the display section corresponding to the given part of the operator; and performing at least one of a process that blurs the object corresponding to the given part, a process that displays the object becoming almost transparent, and a process that changes a color of the object, as the reliability of the information about the bone corresponding to the given part decreases.

21. An image generation method comprising:

acquiring image information from an image sensor;

acquiring motion information about an operator based on the image information from the image sensor;

acquiring detection accuracy information about the motion information;

changing a display state of an image displayed on a display section based on the detection accuracy information about the motion information about the operator; and acquiring the detection accuracy information in which detection accuracy of the motion information decreases when the operator is positioned at a distance equal to or greater than a given distance from the image sensor.

* * * * *